(12) United States Patent
Tabata et al.

(10) Patent No.: US 7,942,775 B2
(45) Date of Patent: May 17, 2011

(54) DRIVE APPARATUS FOR VEHICLE

(75) Inventors: Atsushi Tabata, Okazaki (JP); Yutaka Taga, Aichi-gun (JP); Terufumi Miyazaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 553 days.

(21) Appl. No.: 11/576,090

(22) PCT Filed: Sep. 27, 2005

(86) PCT No.: PCT/JP2005/018252
§ 371 (c)(1),
(2), (4) Date: Mar. 27, 2007

(87) PCT Pub. No.: WO2006/035982
PCT Pub. Date: Apr. 6, 2006

(65) Prior Publication Data
US 2007/0213161 A1 Sep. 13, 2007

(30) Foreign Application Priority Data

Sep. 27, 2004 (JP) ................................. 2004-280655
Sep. 27, 2004 (JP) ................................. 2004-280656

(51) Int. Cl.
*B60K 6/02* (2006.01)
(52) U.S. Cl. ........................ 475/5; 74/606 R; 903/952
(58) Field of Classification Search ........................ None
See application file for complete search history.

(56) References Cited

U.S. PATENT DOCUMENTS

| | | | |
|---|---|---|---|
| 3,861,484 A | 1/1975 | Joslin | |
| 5,935,035 A * | 8/1999 | Schmidt | ............. 475/5 |
| 6,022,287 A * | 2/2000 | Klemen et al. | ................... 475/5 |
| 6,059,059 A | 5/2000 | Schmidt-Bruecken | |
| 6,155,364 A | 12/2000 | Nagano et al. | |
| 6,190,283 B1 | 2/2001 | Uchida | |
| 6,455,947 B1 | 9/2002 | Lilley et al. | |
| 6,729,456 B2 | 5/2004 | Beneton et al. | |
| 7,239,033 B2 * | 7/2007 | Motoike et al. | ............ 290/40 C |
| 7,255,186 B2 | 8/2007 | Wakuta et al. | |
| 2004/0084233 A1 | 5/2004 | Wakuta et al. | |
| 2005/0115750 A1* | 6/2005 | Takami et al. | ............... 180/65.2 |
| 2005/0124457 A1* | 6/2005 | Nakamori et al. | ................ 477/3 |

FOREIGN PATENT DOCUMENTS

CN 1482020 A 3/2004

(Continued)

*Primary Examiner* — Sherry L Estremsky
*Assistant Examiner* — Erin D Bishop
(74) *Attorney, Agent, or Firm* — Oblon, Spivak, McClelland, Maier & Neustadt, L.L.P.

(57) ABSTRACT

A vehicle drive apparatus includes a first electric motor, a power distributing mechanism, a second electric motor, and a step-variable power transmission. A power transmitting portion includes a second case, accommodating the second electric motor and the automatic power transmission. One end of an input shaft of the automatic power transmission faces a drive apparatus output shaft, which is supported with a first support wall mounted on the second case, the second electric motor being accommodated in a compartment opposite to the automatic power transmission with respect to the first support wall, and one end of a second rotor supporting shaft of the second electric motor faces the automatic power transmission, which is supported with a second support wall mounted on the second case. The automatic power transmission and second electric motor can be unitized as one power transmitting portion, improving assembling workability of the drive apparatus.

22 Claims, 11 Drawing Sheets

FOREIGN PATENT DOCUMENTS

| | | |
|---|---|---|
| DE | 199 16 489 | 10/2000 |
| JP | 6 144020 | 5/1994 |
| JP | 9 226392 | 9/1997 |
| JP | 9 226393 | 9/1997 |
| JP | 10 58990 | 3/1998 |
| JP | 2000 224813 | 8/2000 |
| JP | 2000 346187 | 12/2000 |
| JP | 2003 72404 | 3/2003 |
| JP | 2003 130202 | 5/2003 |
| JP | 2003 191759 | 7/2003 |
| JP | 2003 191761 | 7/2003 |
| JP | 2003 336725 | 11/2003 |
| JP | 2004 58921 | 2/2004 |
| JP | 2004 66898 | 3/2004 |
| JP | 2004 254468 | 9/2004 |
| WO | WO03/055709 A1 * | 7/2003 |

* cited by examiner

| | C0 | C1 | C2 | B0 | B1 | B2 | B3 | SPEED RATIO | STEPPING RATIO |
|---|---|---|---|---|---|---|---|---|---|
| 1st | ◎ | ○ | | | | | ○ | 3.357 | 1.54 |
| 2nd | ◎ | ○ | | | | ○ | | 2.180 | 1.53 |
| 3rd | ◎ | ○ | | | ○ | | | 1.424 | 1.42 |
| 4th | ◎ | ○ | ○ | | | | | 1.000 | 1.42 |
| 5th | | ○ | ○ | ◎ | | | | 0.705 | TOTAL 4.76 |
| R | | | ○ | | | | ○ | 3.209 | |
| N | ○ | | | | | | | | |

○ ENGAGED
◎ ENGAGED FOR STEP-VARIABLE SHIFTING, AND RELEASED FOR CONTINUOUSLY-VARIABLE SHIFTING

DRIVE APPARATUS FOR VEHICLE

TECHNICAL FIELD

The present invention relates to a drive apparatus for vehicle, and more particularly, to technologies of improving assembling workability of the drive apparatus including a motor and a gear device, and technologies of preventing a larger device size in the drive apparatus including the motor and a rotating device having a rotating shaft.

BACKGROUND ART

A drive apparatus including a first motor, a first gear device, a second motor and a second gear device has heretofore been known. For instance, it corresponds to a drive apparatus for hybrid vehicle disclosed in Patent Publication 1. With the apparatus disclosed in Patent Publication 1, a planetary gear unit functioning as a power distributing device is provided as the first gear device through which power, delivered from an engine, is transferred to the first electric motor and the second gear device in split modes. Further, the second gear device includes a planetary gear unit, functioning as a gear reduction mechanism, through which the rotation is reduced in speed and transferred to drive wheels. In addition, the first electric motor mainly functions as an electric power generator, and the second electric motor mainly functions as an electric motor to generate auxiliary power to drive the drive wheels separately from power delivered from the engine.

In the above Patent Publication 1, the drive apparatus includes a case having first to third cases. The first case accommodates therein the first motor and the first gear device, the second case accommodates therein the second motor, and the third case accommodates therein the second gear device. In assembling the drive apparatus with such structure, the first motor and the first gear device are accommodated in the first case to form a first unit, and the second motor is accommodated in the second case to form a second unit, while accommodating the second gear device in the third case prepares a third unit. Then, the first unit and the second unit are assembled to both sides of the second unit, respectively.

[Patent Publication 1] Japanese Patent Unexamined Application Publication No. 2003-191759
[Patent Publication 2] Japanese Patent Unexamined Application Publication No. 2003-191761
[Patent Publication 3] Japanese Patent Unexamined Application Publication No. 2003-336725

With the second motor and the second gear device formed in the separate units like those disclosed in Patent Publication 1, the number of split components tends to increase with the resultant problem with a deterioration in assembling workability.

The present invention has been made on the background with the above problem in mind and has an object to provide a drive apparatus for vehicle having improved assembling workability.

Meanwhile, another drive apparatus including a motor and a rotating device having a rotating shaft has heretofore been known (see, for instance, Patent Publication 1). In the Patent Publication 1, the planetary gear unit functioning as the gear reduction mechanism is placed adjacent to the motor as the rotating device such that the rotating shaft of the planetary gear unit is supported with a support wall mounted on the case.

With such a drive apparatus including the motor and the rotating device having the rotating shaft, a stator of the motor is fastened to the case via a spacer by bolt clenching. In such a case, if the support wall and the spacer are separately fixed to the case, respective mounting spaces need to be prepared with the resultant probability of causing the drive apparatus to increase in size (especially in a large size in diameter).

It is therefore a second object of the present invention to provide a drive apparatus for vehicle that can prevent the progress of a large size, even in a case where a spacer is placed between a stator of a motor and a case, and a rotating shaft of a rotating device is supported with a support wall mounted on the case.

DISCLOSURE OF THE INVENTION

For achieving the above first object, the invention recited in the claim 1 is featured by a drive apparatus for vehicle having a first electric motor, a first gear device, a second electric motor and a second gear device, comprising (i) one power transmitting portion including a case, and the second electric motor and the second gear device accommodated in the case; (ii) at least one end of the second gear device being supported with a first support wall mounted on the case; (iii) the second electric motor being accommodated in a compartment formed in the case in opposition to the second gear device with respect to the first support wall for accommodating therein the second electric motor; and (iv) the second electric motor having a rotary shaft being supported with the second support wall fixed to the case on a side opposite to the first support wall with respect to the second electric motor.

According to the first invention, the second gear device and the second electric motor are accommodated in one case and the first support wall and second support wall, mounted on the case, support the second gear device and the rotating shaft of the second electric motor, respectively. This enables the second gear device and the second electric motor to be unitized as one power transmitting portion, resulting in the improvement of assembling workability of the drive apparatus.

Preferably, the drive apparatus for vehicle is, as the invention recited in the claim 2, constructed such that the other power transmitting portion includes the first electric motor and the first gear device. This allows the drive apparatus to include the two power transmitting portions. Thus, after assembling the two power transmitting portions, respectively, mere coupling these component parts to each other enables the drive apparatus to be assembled. This results in a further increase in assembling workability of the drive apparatus.

Preferably, the drive apparatus for vehicle is, as the invention recited in the claim 3, constructed such that the other power transmitting portion has a second case; the second case includes a wall member partitioning the second case into a first accommodating compartment accommodating the first electric motor and a second accommodating compartment accommodating the first gear device; and the first electric motor and the first gear device are coupled to each other for power transmitting capability with the wall member intervening therebetween. With such structure, with maintaining the power transmission between the first gear device and the first electric motor, the first gear device can be accommodated from one side of the case while the first electric motor can be accommodated from other side of the case, resulting in further increase of the assembling workability.

The drive apparatus for vehicle is, as the invention recited in the claim 4, preferably constructed such that the one transmitting portion and the other power transmitting portion are connected to each other. However, a third power transmitting portion can be intervened between the both power transmitting portions.

The invention recited in the claim 1 is, as recited in the claim 5, particularly effective for a case where the second gear device includes a plurality of planetary gear units. With the use of such a plurality of planetary gear units, the number of component parts tends to increase with the resultant problem of assembling workability. However, even if the second gear device includes the plurality of planetary gear units, the structure of the invention recited in the claim 1 enables the second electric motor and the second gear device to be formed as one unit.

That is, after the second gear device is assembled in the case, the first support wall and the second electric motor are accommodated, followed by the second support wall being mounted. Thus, the second electric motor and the second gear device can be constructed as one unit. Accordingly, no need arises for the second electric motor and the second gear device to be formed in separate units, minimizing the total number of units forming the drive apparatus with the resultant improvement in assembling workability.

Preferably, as recited in the claim 6, the drive apparatus for vehicle is constructed such that the first support wall has an outer circumferential surface held in abutting contact with an inner circumferential surface of the case; and the rotary shaft of the second electric motor is rotatably supported with the first support wall. With such structure, since the first support wall is radially positioned in high accuracy, the axis position of the rotor support shaft of the second electric motor supported by the first support wall can be supported with high accuracy.

Preferably, as recited in the claim 7, the drive apparatus for vehicle is constructed such that the outer circumferential surface of the second support wall is held in abutting contact with the inner circumferential surface of the case. With such structure, the rotor support shaft of the second electric motor is supported with the two support walls fixed in the case on highly precise radial positions on both sides of the second electric motor. Thus, the rotor support shaft of the second electric motor can have an axial position fixed in a further increased precision.

Preferably, as recited in the claim 8, the second support wall is formed with a concaved portion axially concaved for accommodating a stator coil of the second electric motor, and an outer circumferential margin of the second support wall being connected to an opening margin of the concaved portion. With such arrangement, accommodation of the stator coil of the second electric motor in the axially concaved portion enables effective utilization of the space, resulting in shortened axial length of the drive apparatus.

Preferably, as recited in the claim 9, the first gear device is rotatably supported with the wall member of the second case; as recited in the claim 10, the first support wall is fixed to the case by bolts; and as recited in the claim 11, the second support wall is fixed to the case by bolts. With these structures, both the first support wall and the second support wall can be easily assembled to the case.

For achieving the above second object, the invention recited in the claim 12 is featured by a drive apparatus for vehicle, comprising (i) an electric motor; (ii) a rotating device having a rotating shaft; (iii) a stator of the electric motor being mounted on a case via a spacer; and (iv) the rotating shaft of the rotating device being rotatably supported with a support wall mounted on the case, (v) wherein the spacer and the support wall are integrally formed with each other.

For achieving the above object, the invention recited in the claim 13 is featured by (i) an electric motor; (ii) a rotating device having a rotating shaft; and (iii) the rotating shaft of the rotating device being rotatably supported with a support wall mounted on a case, (iv) wherein under a status the support wall being interposed between a stator of the electric motor and the case, both the stator and the support wall are fastened to the case by bolts.

According to the invention recited in the claim 12, since the spacer is integrally formed with the support wall, fixing the support wall to the case enables the spacer to be fixed to the case at the same time. Thus, no need arises for a structure to be provided for separately fixing the spacer to the case. This results in capability of preventing the drive apparatus from increasing in size.

According to the invention recited in the claim 13, the support wall, intervening between the case and the stator of the electric motor, functions as the spacer between the stator of the electric motor and the case. Thus, no need arises for separately providing the spacer, enabling the drive apparatus to be prevented from increasing in size by an extent equivalent to a space for the spacer to be mounted.

Preferably, as the invention recited in the claim 14, the rotating device is a gear device having a gear and a gear shaft. More preferably, as the invention recited in the claim 15, the gear device has a plurality of planetary gear units.

Preferably, the rotary shaft of the rotating device is rotatably supported with the support wall; and as recited in the claim 16, the electric motor also has a rotor rotatably supported with the support wall.

Preferably, as the invention recited in the claim 17, the gear shaft of the gear device has one end supported with the support wall and the other end supported with a rotor support shaft of the electric motor.

EXPLANATION OF REFERENCES

Figures 1, 2:
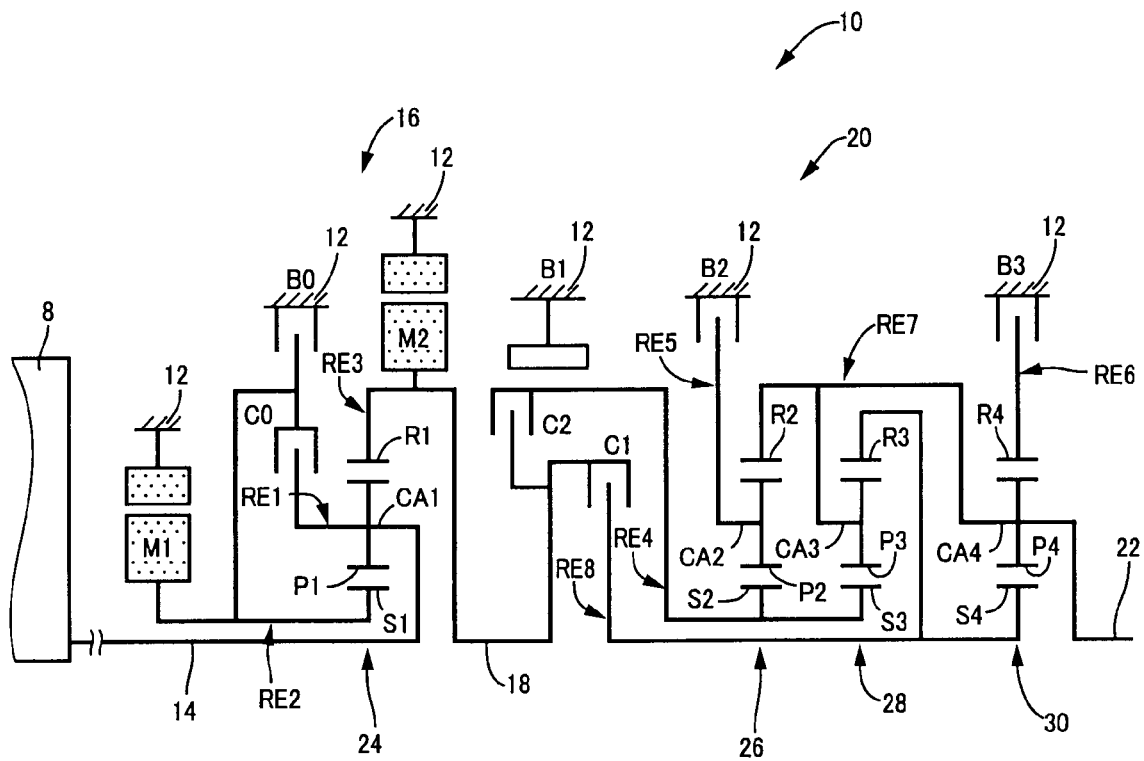
FIG. 1 is a skeleton view explaining a drive apparatus for a hybrid vehicle according to one embodiment of the present invention.
FIG. 2 is an operation Table indicating a relation between a shifting operation of the drive apparatus for the hybrid vehicle of the embodiment shown in FIG. 1 operable in a continuously-variable shifting state or a step-variable shifting state, and operation combinations of hydraulic-type frictionally coupling devices used therefor.

10: drive apparatus for vehicle
12: case
12a: first case (second case)
12b: second case
16: power distribution mechanism (first gear device)
20: step-variable automatic transmission (second gear device)
26, 28, 30: planetary gear unit
70: first unit (first power transmitting portion)
72: partition wall (wall member)
100: second unit (second power transmitting portion)
104: input shaft (of automatic transmission)
106: first support wall
106c: outer peripheral cylinder (spacer)
112: second stator
114: second rotor
116: second rotor support shaft
118: bolt
122: second support wall
122b: recess
122c: outer periphery
124: bolt
M1: first electric motor
M2: second electric motor

BEST MODE FOR CARRYING OUT THE INVENTION

Hereinafter, embodiments of the present invention will be explained with reference to attaching drawings. FIG. 1 is a skeleton view explaining a drive apparatus 10 for a hybrid vehicle according to one embodiment of the present invention. The drive apparatus 10 includes a drive apparatus input shaft 14, a power distribution mechanism 16, an automatic transmission 20 and a drive apparatus output shaft 22 all coaxially disposed in a transmission case 12 (hereinafter briefly referred to as "case 12") as a non-rotatable member fixed to a vehicle body. The drive apparatus input shaft 14 as an input rotation member is fixed to the case 12. The power distribution mechanism 16 is connected to the input shaft 14 directly or indirectly via a pulsation absorbing damper (vibration damping device) not shown.

The automatic transmission 20 of a step-variable type is disposed between the distribution mechanism 16 and drive apparatus output shaft 22 to be connected thereto in series. The drive apparatus output shaft 22 as an output rotation member is connected to the automatic transmission 20. In the present embodiment, the power distribution mechanism 16 and the step-variable automatic transmission 20 respectively correspond to the claimed first gear device and the second gear device. In a second embodiment, the above automatic transmission 20 corresponds to the claimed gear device i.e., the rotating device.

Figure 7:
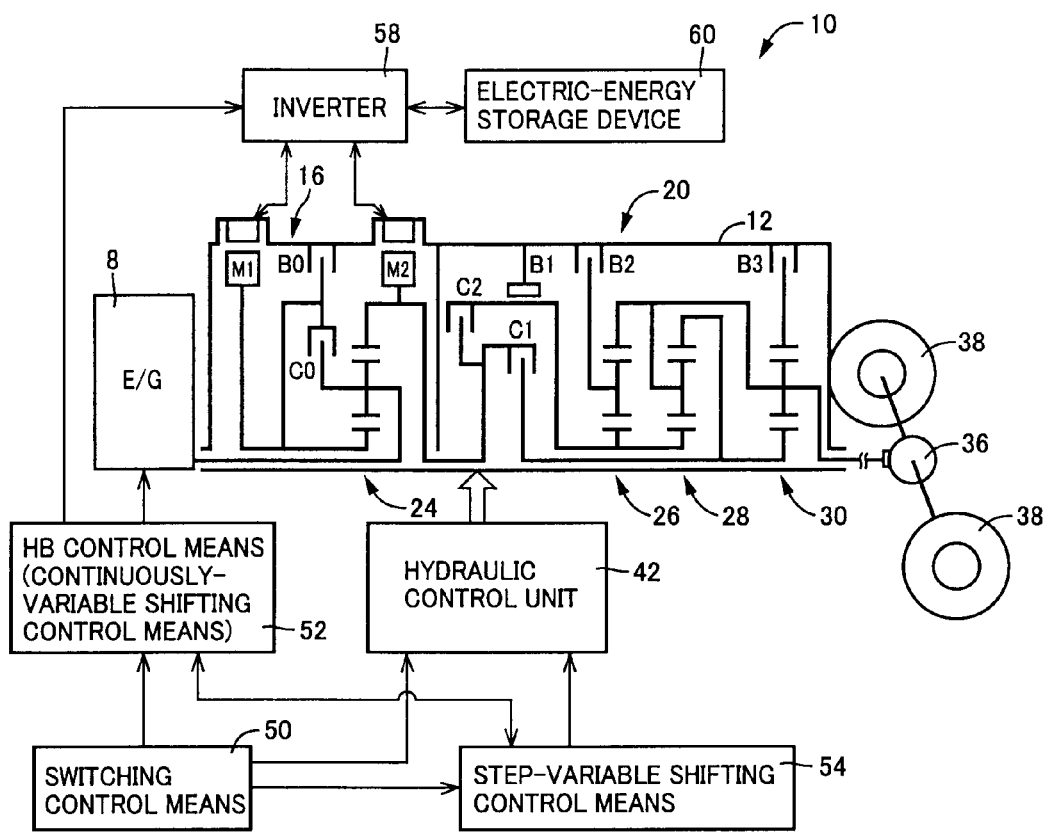
FIG. 7 is a functional block diagram explaining a main control operation performed by the electronic control device shown in FIG. 4.

This drive apparatus 10 is suitably used for a transverse FR vehicle (front-engine, rear-drive vehicle), and is disposed as shown in FIG. 7 between a drive power source in the form of an engine 8 and a pair of drive wheels 38, to transmit a vehicle drive force to the pair of drive wheels 38 through a differential gear device 36 (final speed reduction gear) and a pair of drive axles. It is noted that a lower half of the drive apparatus 10 constructed symmetrically with respect to its axis, is omitted in FIG. 1.

The power distribution mechanism 16 is a mechanical mechanism synthesizing or distributing the output of the engine 8 input to the drive apparatus input shaft 14. That is, it distributes the output of the engine 8 to the first electric motor M1 and the transmitting member 18, and synthesizes the outputs of the engine 8 and the first electric motor M1 to output it to the transmitting member 18. The second electric motor M2 is rotatable integral with the transmitting member 18. In the present embodiment, the first electric motor M1 and the second electric motor M2 are a so-called motor/generator also functioning as an electric generator. The first electric motor M1 should function at least as an electric generator to generate an electric energy while generating a reaction force, and the second electric motor M2 should function at least as an electric motor to generate a drive force of the vehicle.

The power distribution mechanism 16 includes a first planetary gear unit 24 of single pinion type having a gear ratio ρ1 of about 0.418, for example, a switching clutch C0 and a switching brake B0. The first planetary gear unit 24 has as rotating elements a first sun gear S1, a first planetary gear P1, a first carrier CA1 supporting the first planetary gear P1 to be rotatable about its axis and about the axis of the first sun gear S1, and a first ring gear R1 meshing with the first sun gear S1 through the first planetary gear P1. Representing the numbers of teeth of the first sun gear S1 and the first ring gear R1 by ZS1 and ZR1, respectively, the above gear ratio ρ1 is represented by ZS1/ZR1.

In the power distribution mechanism 16, the first carrier CA1 is connected to the drive apparatus input shaft 14, i.e., to the engine 8, the first sun gear S1 is connected to the first electric motor M1, and the first ring gear R1 is connected to the transmitting member 18. The switching brake B0 is disposed between the first sun gear S1 and the casing 12, and the switching clutch C0 is disposed between the first sun gear S1 and the first carrier CA1. Upon release of the switching clutch C0 and brake B0, the first sun gear S1, first carrier CA1 and first ring gear R1 are placed in a differential state to be rotatable relative to each other, to perform a differential function. Thus, the output of the engine 8 is distributed to the first electric motor M1 and the transmitting member 18, a part of the output distributed to the first electric motor M1 is used to generate power i.e, electricity thereat. The second electric motor M2 is driven for rotation by en electric energy generated at the first electric motor M1 or en electric energy stored. Accordingly, the power distribution mechanism 16 is placed in for example the continuously variable shifting state, in which the rotating speed of the transmitting member 18 changes continuously, irrespective of the rotating speed of the engine 8.

That is, the power distribution mechanism 16 is placed in the differential state in which a speed ratio γ0 (rotating speed of the driving device input shaft 14/rotating speed of the transmitting member 18) electrically changes from a minimum value γ0 min to a maximum value γ0max. For example it is placed in the differential state, for example in the continuously variable shifting state, to function as an electrically continuously variable transmission of which the speed ratio $\gamma 0$ continuously varies from the minimum value $\gamma 0\min$ to the maximum value $\gamma 0\max$.

In this state, during the vehicle running by the output of the engine 8, when the first sun gear S1 and the first carrier CA1 are engaged integrally by engagement of the switching clutch C0, the rotary elements of the first planetary gear unit 24 including the first sun gear S1, first carrier CA1 and first ring gear R1 are placed in a locked state or a non-differential state to be rotatable as a unit. Thus, the rotating speeds of the engine 8 and the transmitting member 18 are coincided with each other, so that the power distribution mechanism 16 is placed in a fixed shifting state functioning as the transmission having a fixed speed ratio $\gamma 0$ equal to 1.

Then, by engagement of the switching brake B0 instead of the switching clutch C0, the power distribution mechanism 16 is placed in a locked state or non-differential state in which the first sun gear S1 is placed in a non-rotatable state, the rotating speed of the first ring gear R1 is made higher than that of the first carrier CA1, so that the power distribution mechanism 16 is placed in the fixed shifting state functioning as a speed-increasing transmission having a fixed speed ratio $\gamma 0$ smaller than 1, for example, about 0.7.

In the present embodiment described above, the switching clutch C0 and brake B0 selectively place the first planetary gear unit 24 in the differential state and in the locked state, functioning as a differential limiting device which limits or restricts the differential operation of the rotary elements. That is, in the differential state (continuously variable state), the first planetary gear unit 24 functions as the electrically controlled continuously variable transmission of which the shifting ratio can be continuously varied. In the locked state or the fixed shifting state, the first planetary gear unit 24 is inhibited its continuously variable shifting operation and impossible to function as the electrically controlled continuously variable transmission, being locked its shifting ratio variation. Thus, in the locked state, the first planetary gear unit 24 operates as the transmission which has the single gear position or multiple gear positions.

The automatic transmission 20 includes plural planetary gear units, that is a single-pinion type second planetary gear unit 26, a single-pinion type third planetary gear unit 28 and a single-pinion type fourth planetary gear unit 30. The second planetary gear unit 26 includes a second sun gear S2, a second planetary gear P2, a second carrier CA2 supporting the second planetary gear P2 to be rotatable about its axis and about the axis of the second sun gear S2, and a second ring gear R2 meshing with the second sun gear S2 through the second planetary gear P2, having for example a gear ratio $\rho 2$ of about 0.562.

The third planetary gear unit 28 includes a third sun gear S3, a third planetary gear P3, a third carrier CA3 supporting the third planetary gear P3 to be rotatable about its axis and about the axis of the third sun gear S3, and a third ring gear R3 meshing with the third sun gear S3 through the third planetary gear P3, having for example a gear ratio $\rho 3$ of about 0.425. The fourth planetary gear unit 30 includes a fourth sun gear S4, a fourth planetary gear P4, a fourth carrier CA4 supporting the fourth planetary gear P4 to be rotatable about its axis and about the axis of the fourth sun gear S4, and the fourth ring gear R4 meshing with the fourth sun gear S4 through the fourth planetary gear P4, having a gear ratio $\rho 4$ of about 0.421.

Representing the numbers of teeth of the second sun gear S2, second ring gear R2, third sun gear S3, third ring gear R3, fourth sun gear S4 and fourth ring gear R4 by ZS2, ZR2, ZS3, ZR3, ZS4 and ZR4, respectively, the above gear ratios $\rho 2$, $\rho 3$ and $\rho 4$ are represented by ZS2/ZR2, ZS3/ZR3 and ZS4/ZR4, respectively.

In the automatic transmission 20, the second sun gear S2 and the third sun gear S3 integrally fixed to each other as a unit are selectively connected to the transmitting member 18 through a second clutch C2, and are selectively fixed to the casing 12 through a first brake B1. The second carrier CA2 is selectively connected to the casing 12 through the second brake B2, and the fourth ring gear R4 is selectively fixed to the transmission casing 12 through a third brake B3. The second ring gear R2, third carrier CA3 and fourth carrier CA4 integrally fixed to each other are fixed to the output shaft 22. The third ring gear R3 and the fourth sun gear S4 integrally fixed to each other are selectively connected to the transmitting member 18 through a first clutch C1.

The switching clutch C0, the first clutch C1, the second clutch C2, the switching brake B0, the first brake B1, the second brake B2 and the third brake B3 are hydraulic-type frictionally coupling devices conventionally used in the vehicular automatic transmission. The frictionally coupling device includes a wet-type multiple-disc clutch in which a plurality of friction plates superposed on each other are forced against each other by a hydraulic actuator, or a band brake in which a rotary drum and one band or two bands wound on an outer circumferential surface thereof is tightened at one end by a hydraulic actuator.

In the drive apparatus 10 thus constructed, as shown in an operation Table of FIG. 2, one of a first-gear position (first-speed position) through a fifth-gear position (fifth-speed position), a reverse-gear position (rear-drive position) and a neural position is selectively established by engagement of the switching clutch C0, the first clutch C1, the second clutch C2, the switching brake B0, the first brake B1, the second brake B2 and the third brake B3. Those positions have respective speed ratios $\gamma$ (input shaft speed $N_{IN}$/output shaft speed $N_{OUT}$) which change as geometric series.

In particular, in this embodiment, owing to provision of the switching clutch C0 and brake B0, the power distribution mechanism 16 can be selectively placed, in addition to the continuously-variable shifting state operable as the continuously variable transmission, in the fixed shifting state operable as the transmission of the single step or multiple steps having one or not less than two kinds of shifting ratio. In the drive apparatus 10, the step-variable transmission is constituted by the automatic transmission 20 and the power distribution mechanism 16 placed in the fixed shifting state engagement of the switching clutch C0 or the switching brake B0. Further, the continuously-variable transmission is constituted by the automatic transmission 20 and the power distribution mechanism 16 placed in the continuously-variable shifting state, with none of the switching clutch C0 and brake B0 being engaged.

For example, when the drive apparatus 10 functions as the step-variable transmission, for example, as shown in FIG. 2, engagement of the switching clutch C0, the first clutch C1 and the third brake B3 establish the first-gear position having the highest speed ratio $\gamma 1$ of about 3.357, for example, and engagement of the switching clutch C0, the first clutch C1 and the second brake B2 establish the second-gear position having the speed ratio $\gamma 2$ of about 2.180, for example, which is lower than the speed ratio $\gamma 1$. Further, engagement of the switching clutch C0, first clutch C1 and first brake B1 establish the third-gear position having the speed ratio $\gamma 3$ of about 1.424, for example, which is lower than the speed ratio $\gamma 2$, and engagement of the switching clutch C0, first clutch C1 and second clutch C2 establish the fourth-gear position having the speed ratio γ4 of about 1.000, for example, which is lower than the speed ratio γ3.

Engagement of the first clutch C1, second clutch C2 and switching brake B0 establishes the fifth-gear position having the speed ratio γ5 of about 0.705, for example, which is smaller than the speed ratio γ4. Further, engagement of the second clutch C2 and the third brake B3 establishes the reverse-gear position having the speed ratio γR of about 3.209, for example, which positions between the speed ratios γ1 and γ2. The neutral position N is established by engaging only the switching clutch C0.

However, when the drive apparatus 10 functions as the continuously-variable transmission, as shown in FIG. 2, the switching clutch C0 and the switching brake B0 are both released. With this, the power distribution mechanism 16 functions as the continuously-variable transmission, while the automatic transmission 20 connected in series thereto functions as the step-variable transmission. The rotating speed to be input to the automatic transmission 20 placed in one of the first-gear, second-gear, third-gear and fourth-gear positions, that is the rotating speed of the transmitting member 18 is continuously changed so that the continuous shifting ratio width can be obtained for each of the gear positions. Accordingly, since the speed ratio of the automatic transmission 20 is continuously variable across the adjacent gear positions, the overall speed ratio γT of the drive apparatus 10 is continuously variable.

Figure 3:
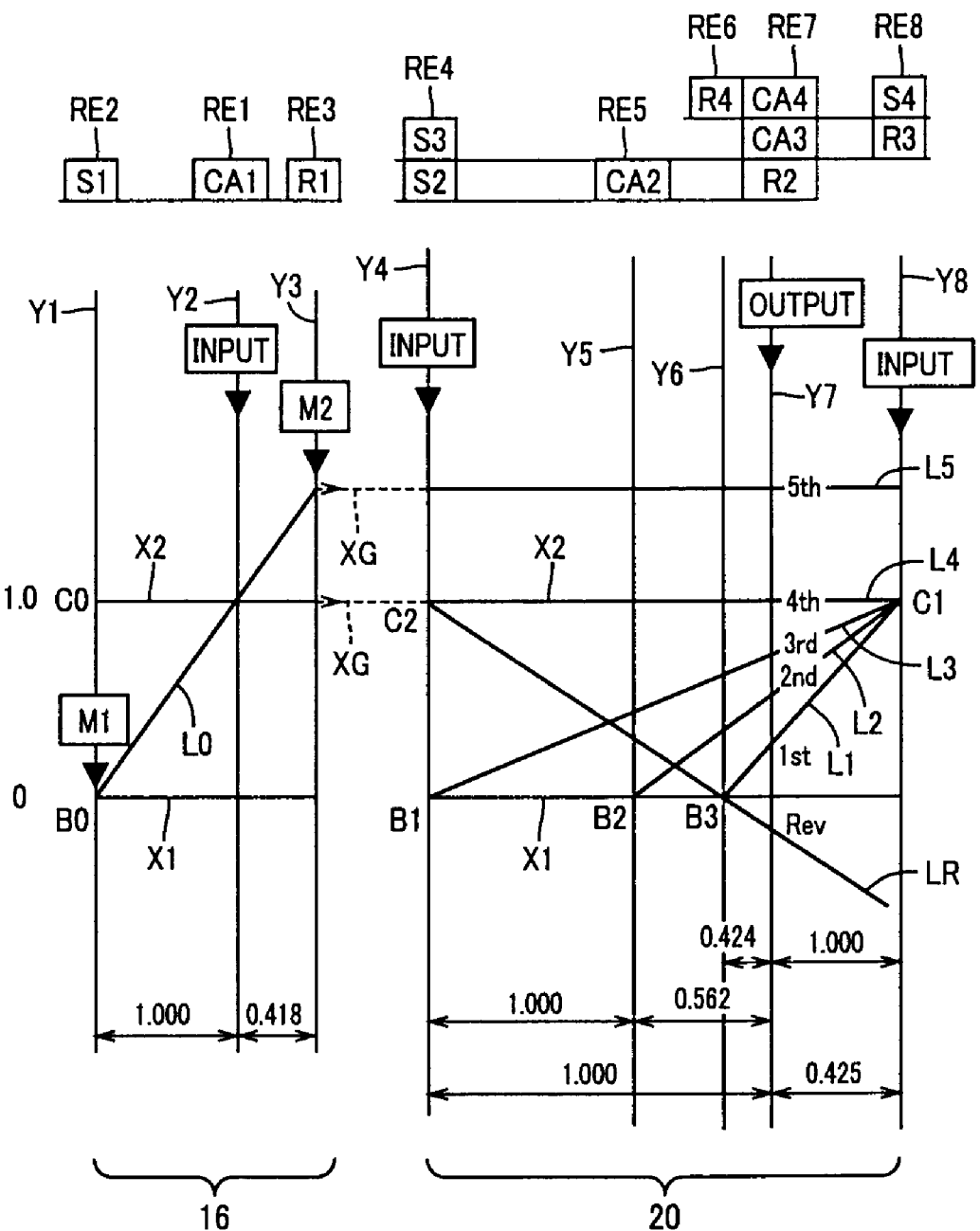
FIG. 3 is a collinear chart showing relative rotating speeds of rotary elements in each of different gear positions when the drive apparatus for the hybrid vehicle of the embodiment shown in FIG. 1 is operated in the step-variable shifting state.

FIG. 3 shows a collinear chart representing by straight lines a relation among the rotating speeds of the rotary elements different in each of the gear positions of the drive apparatus 10. The drive apparatus 10 is constituted by the power distribution mechanism 16 functioning as the continuously-variable shifting portion or first shifting portion, and the automatic transmission 20 functioning as the step-variable shifting portion or second shifting portion. The collinear chart of FIG. 3 is a rectangular two-dimensional coordinate system in which the gear ratios ρ of the planetary gear units 24, 26, 28 and 30 are taken along the horizontal axis, while the relative rotating speeds of the rotary elements are taken along the vertical axis. A lower one X1 of three horizontal lines indicates the rotating speed of 0, and an upper one X2 indicates the rotating speed of 1.0, that is, an operating speed $N_E$ of the engine 8 connected to the driving device input shaft 14. The horizontal line XG indicates the rotating speed of the transmitting member 18.

Among three vertical lines Y1, Y2 and Y3 corresponding to the three elements of the power distribution mechanism 16, respectively represent from the left the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined corresponding to the gear ratio ρ1 of the first planetary gear unit 24. That is, when the distance between the vertical lines Y1 and Y2 is set to "1", the distance between the vertical lines Y2 and Y3 corresponds to the gear ratio ρ1.

Further, five vertical lines Y4, Y5, Y6, Y7 and Y8 corresponding to the automatic transmission 20 respectively represent from the left the relative rotating speeds of a fourth rotary element (fourth element) RE4, a fifth rotary element (fifth element) RE5, a sixth rotary element (sixth element) RE6, a seventh rotary element (seventh element) RE7, and an eighth rotary element (eighth element) RE8. The fourth rotary element RE4 has a form of the second and third sun gears S2, S3 integrally fixed to each other, the fifth rotary element RE5 has a form of the second carrier CA2, and the sixth rotary element RE6 has a form of the fourth ring gear R4. The seventh rotary element RE7 has a form of the second ring gear R2 and third and fourth carriers CA3, CA4 integrally fixed to each other, and the eighth rotary element RE8 has a form of the third ring gear R3 and fourth sun gear S4 integrally fixed to each other.

The distances between the adjacent ones of the vertical lines Y4-Y8 are determined by the gear ratios ρ2, ρ3 and ρ4 of the second, third and fourth planetary gear units 26, 28 and 30. That is, as shown in FIG. 3, for each of the second, third and fourth planetary gear units 26, 28 and 30, the distances between the sun gear and carrier corresponds to "1", and the distances between the carrier and ring gear corresponds to the gear ratio ρ.

Expressing by the collinear chart of FIG. 3, the drive apparatus 10 of this embodiment is, in the power distribution mechanism (continuously-variable shifting portion) 16, arranged such that the first rotary element RE1 (the first carrier CA1), which is one of the three rotary elements of the first planetary gear unit 24, is fixed to the drive device input shaft 14, and selectively connected to the first sun gear S1 as another rotary element through the switching clutch C0. The second rotary element RE2 (the first sun gear S1) as another rotary element is fixed to the first electric motor M1 and selectively fixed to the casing 12 through the switching brake B0. The third rotary element RE3 (the first ring gear R1) as still another rotary element is fixed to the transmitting member 18 and the second electric motor M2.

Thus, a rotation of the drive device input shaft 14 is transmitted (input) to the automatic transmission (step-variable transmission portion) 20 through the transmitting member 18. An inclined straight line L0 which passes an intersection point between the lines Y2 and X2 represents a relation between the rotating speeds of the first sun gear S1 and the first ring gear R1.

Figure 4:
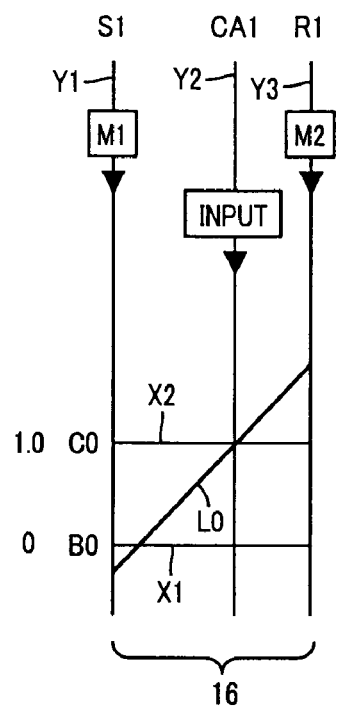
FIG. 4 is a view representing one example of the power distribution mechanism switched to the continuously-variable shifting state, corresponding to a the power distribution mechanism part in the collinear chart shown in FIG. 3.
Figure 5:
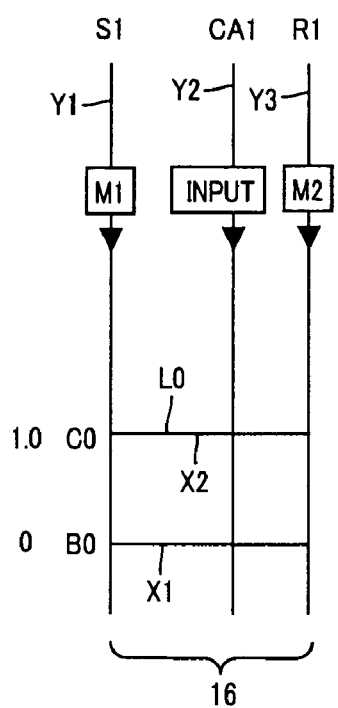
FIG. 5 is a view representing a state of the power distribution mechanism switched to the step-variable shifting state by engagement of the switch clutch C0, corresponding to the power distribution mechanism part in the collinear chart shown in FIG. 3.

FIGS. 4 and 5 are figures correspond to a part of the power distribution mechanism 16 of the collinear chart of FIG. 3. FIG. 4 shows one example of an operating state of the power distribution mechanism 16 placed in the continuously-variable shifting state with of the switching clutch C0 and the switching brake B0 held in the released state. The rotating speed of the first sun gear S1 represented by the intersection point between the straight line L0 and a vertical line Y1 is raised or lowered by controlling a reaction force resulted from a power generation at first electric motor M1, so that the rotating speed of the first ring gear R1 represented by the intersection point between the lines L0 and Y3 is lowered or raised.

FIG. 5 shows one example of a state of the power distribution mechanism 16 placed in the fixed shifting state with of the switching clutch C0 held in the engaged state. By connection of the first sun gear S1 and the first carrier CA1 the three rotary elements rotate as a unit, the line L0 being aligned with the horizontal line X2, which results in that the transmitting member 18 is rotated at the same speed as the engine speed $N_E$. When rotation of the transmitting member 18 is stopped by engagement of the switching brake B0, the rotating speed of the first ring gear R1 represented by an intersection point between the inclined straight line L0 and vertical line Y3, that is the rotation of the transmitting member 18 is made higher than the engine speed $N_E$ and transmitted to the automatic transmission 20.

In the automatic transmission 20, the fourth rotary element RE4 is selectively connected to the transmitting member 18 through the second clutch C2 and selectively fixed to the casing 12 through the first brake B1, the fifth rotary element RE5 is selectively fixed to the casing 12 through the second brake B2, and the sixth rotary element RE6 is selectively fixed to the casing 12 through the third brake B3. The seventh rotary element RE7 is fixed to the drive apparatus output shaft 22, and the eighth rotary element RE8 is selectively connected to the transmitting member 18 through the first clutch C1.

As shown in FIG. 3, in the automatic transmission 20, upon engagement of the first clutch C1 and the third brake B3, the rotating speed of the drive apparatus output shaft 22 in the first-speed position is represented by an intersection point between the inclined linear line L1 and the vertical line Y7. Here, the inclined straight line L1 passes an intersection point between the vertical line Y8 indicative of the rotating speed of the eighth rotary element RE8 and the horizontal line X2, and an intersection point between the vertical line Y6 indicative of the rotating speed of the sixth rotary element RE6 and the horizontal line X1.

Similarly, the rotating speed of the drive apparatus output shaft 22 in the second-speed position is represented by an intersection point between an inclined straight line L2 determined by engagement of the first clutch C1 and second brake B2, and the vertical line Y7 indicative of the rotating speed of the seventh rotary element RE7 fixed to the drive apparatus output shaft 22. The rotating speed of the drive apparatus output shaft 22 in the third-speed position is represented by an intersection point between an inclined straight line L3 determined by engagement of the first clutch C1 and first brake B1, and the vertical line Y7 indicative of the rotating speed of the seventh rotary element RE7 fixed to the drive apparatus output shaft 22. The rotating speed of the drive apparatus output shaft 22 in the fourth-speed position is represented by an intersection point between a horizontal line L4 determined by engagement of the first clutch C1 and second clutch C2, and the vertical line Y7 indicative of the rotating speed of the seventh rotary element RE7 fixed to the drive apparatus output shaft 22.

In the first-speed through fourth-speed positions, as result of engagement of the switching clutch C0, power from the power distribution mechanism 16 is input to the eighth rotary element RE8 with the rotating speed the same as that of the engine speed $N_E$. However, when the switching clutch B0 engages instead of the switching clutch C0, since power from the power distribution mechanism 16 is input to the eighth rotary element RE8 with a speed higher than the engine speed $N_E$, the rotating speed of the drive apparatus output shaft 22 in the fifth-speed position is represented by an intersection point between a horizontal line L5 and the vertical line Y7. Here, the horizontal line L5 is determined by engagement of the first clutch C1, second clutch C2 and switching brake B0, and the vertical line Y7 indicates the rotating speed of the seventh rotary element RE7 fixed to the output shaft 22. The rotating speed of the drive apparatus output shaft 22 in the reverse-gear position R is represented by an intersection point between an inclined straight line LR determined by engagement of the second clutch C2 and third brake B3, and the vertical line Y7 indicative of the rotating speed of the seventh rotary element RE7 fixed to the drive apparatus output shaft 22.

Figure 6:
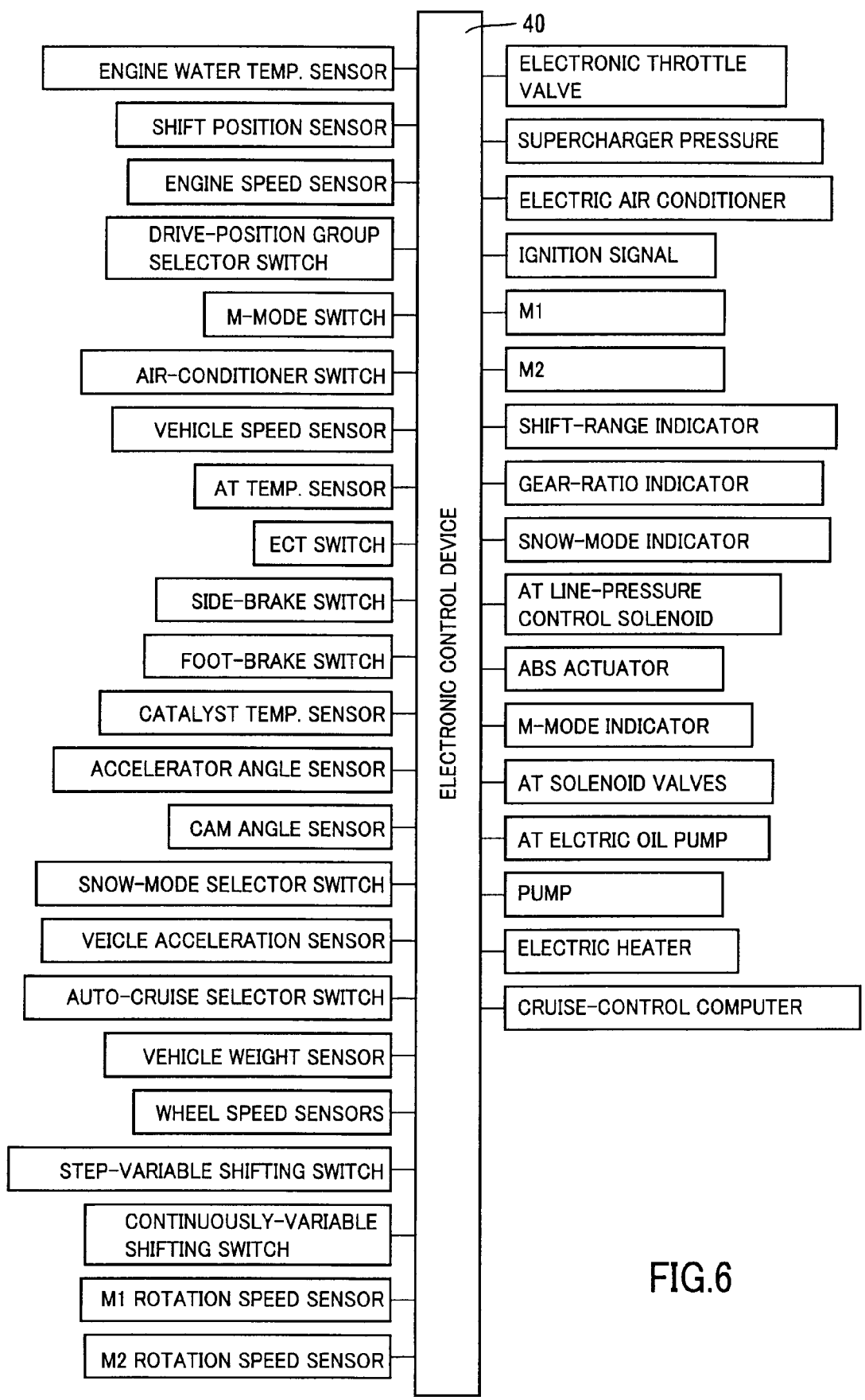
FIG. 6 is a view explaining an input signal and output signal of an electronic control device provided in the drive apparatus of the embodiment shown in FIG. 1.

FIG. 6 illustrates signals input to an electronic control device 40 and signals output therefrom to control the drive apparatus 10. This electronic control device 40 includes a so-called microcomputer incorporating a CPU, a ROM, a RAM and an input/output interface. By performing signal processing according to programs stored in the ROM utilizing a temporary data storage function of the ROM, it implements hybrid drive controls of the engine 8 and electric motors M1 and M2, and drive controls such as shifting controls of the automatic transmission 20.

To the electronic control device 40, from various sensors and switches shown in FIG. 6, various signals are inputted, which include a signal indicative of a temperature of cooling water of the engine, a signal indicative of a selected operating position of a shift lever, a signal indicative of the operating speed $N_E$ of the engine 8, a signal indicative of a set value of gear ratio row, a signal indicative of a command for M mode (motor drive mode), a signal indicative of an operated state of an air conditioner, a signal indicative of a vehicle speed corresponding to the rotating speed of the drive apparatus output shaft 22, a signal indicative of a working oil temperature of the automatic transmission 20, a signal indicative of an operated state of a side brake, a signal indicative of an operated state of a foot brake, a signal indicative of a catalyst temperature, a signal indicative of an opened amount of an accelerator pedal, a signal indicative of a cam angle, a signal indicative of a snow drive mode, a signal indicative of a longitudinal acceleration value of the vehicle, and a signal indicative of an auto-cruising drive mode.

Also inputted are a signal indicative of a vehicle weight, a signal indicative of wheel speed of each drive wheel, a signal indicative of operation of a step-variable switch for changing the power transmitting mechanism 16 to the fixed shifting state so that the drive apparatus 10 functions as the step-variable transmission, a signal indicative of operation of a continuous-variable switch for changing the power transmitting mechanism 16 to the continuously-variable shifting state so that the drive apparatus 10 functions as the continuously-variable transmission, a signal indicative of the rotating speed $N_{M1}$ of the first electric motor M1, and a signal indicative of the rotating speed $N_{M2}$ of the second electric motor M2.

From the electronic control device 40, various signals are outputted, which include a signal to drive a throttle actuator for controlling an opening of a throttle valve, a signal to adjust a supercharger pressure; a signal to operate the electric air conditioner, a signal for controlling an ignition timing of the engine 8, signals to operate the electric motors M1 and M2, a signal to operate a shift-range indicator for indicating the selected operating position of the shift lever, a signal to operate a gear-ratio indicator for indicating the gear ratio, a signal to operate a snow-mode indicator for indicating the selection of the snow drive mode, a signal to operate an ABS actuator for anti-lock braking of the wheels, and a signal to operate an M-mode indicator for indicating the selection of the M-mode.

Also output are signals to operate solenoid-operated valves incorporated in a hydraulic control unit 42 provided to control the hydraulic actuators of the hydraulically operated frictional coupling devices of the power distribution mechanism 16 and the automatic transmission 20, a signal to operate an electric oil pump used as a hydraulic pressure source for the hydraulic control unit 42, a signal to drive an electric heater, and a signal to be applied to a cruise-control computer.

FIG. 7 is a functional block diagram explaining a main control functions performed by the electronic control device 40. Switching control means 50 determines whether the vehicle condition is the continuously variable shifting region for placing the drive apparatus 10 in the continuously-variable shifting state, or in a step-variable shifting region for placing the same in the step-variable shifting state, based on a relation shown in FIG. 8 or FIG. 9 and stored in advance. In using the relation (shifting map) shown in FIG. 8, the vehicle condition is determined based on the actual operating speed $N_E$ of the engine 8 and a drive-force-related value related to the drive force of the hybrid vehicle such as an output torque $T_E$ of the engine.

Figure 8:
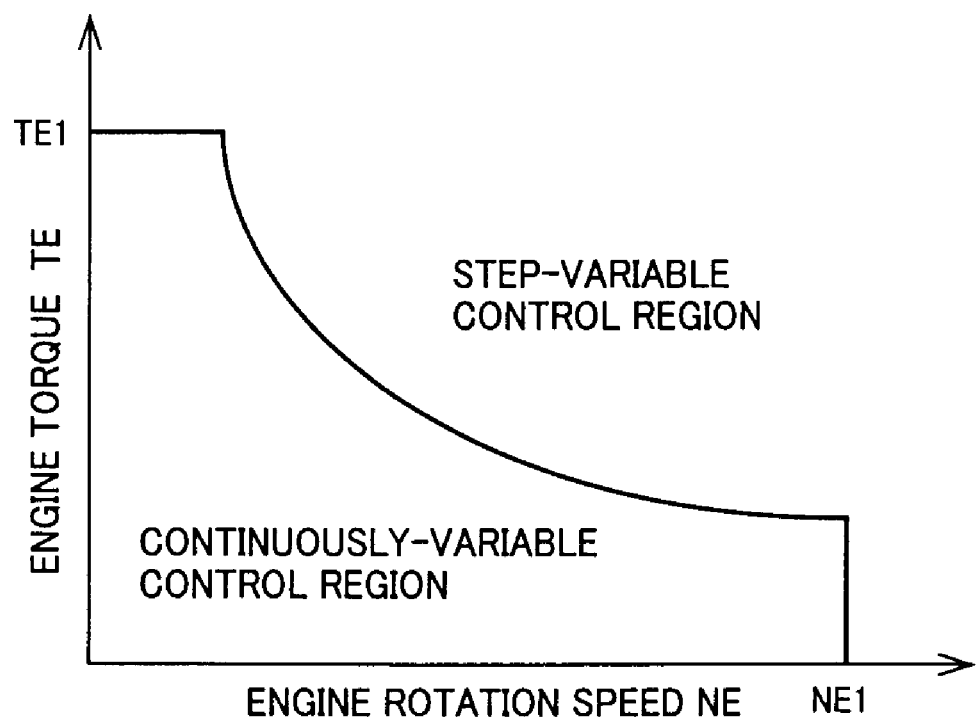
FIG. 8 is a view showing a relation memorized in advance to be used by switching control means shown in FIG. 7 for switching to the continuously-variable control region or the step-variable control region.

In the relation shown in FIG. 8, three regions of a high-torque region, a high-rotation region, and a high-output region are set as the step-variable shifting region. In the high-torque region (high-output running region) the output torque $T_E$ of the engine 8 is not smaller than a predetermined value $T_{E1}$, in the high-rotation region (high-vehicle speed region) the engine speed $N_E$ is not lower than a predetermined value $N_{E1}$, that is the vehicle speed which is one of the vehicle condition determined by the rotating speed of the engine and the total shifting ratio γT is not less than the predetermined value, and in the high-output region the engine output determined by the output torque $T_E$ and speed $N_E$ of the engine 8 is not smaller than a predetermined value.

Accordingly, the step-variable shifting control is effected for the comparatively high torque, the comparatively high peed or the comparatively high output of the engine 8, so that the rotating speed of the engine 8 rhythmically changes in response to change of the rotating speed $N_E$ of the engine i.e., shifting upon up-shifting. In other words, in the high output running, in view of preference of the driver's requirement to the drive force than that to the fuel economy, the drive apparatus 10 is switched to the step-variable shifting state (fixed shifting state) than the continuously-variable shifting state. With this, the driver can enjoy the rhythmical change of the rotating speed $N_E$ of the engine.

To the contrary, in the normal output region of the engine, that is in the comparatively low torque, the comparatively low peed or the comparatively low output of the engine 8, the continuously-variable shifting control is effected. A boundary line in FIG. 8 between the step-variable shifting region and the continuously-variable shifting region, corresponds to a high vehicle speed determination line which is series of high vehicle speed determination points, and a low vehicle speed determination line which is series of low vehicle speed determination points.

Figure 9:
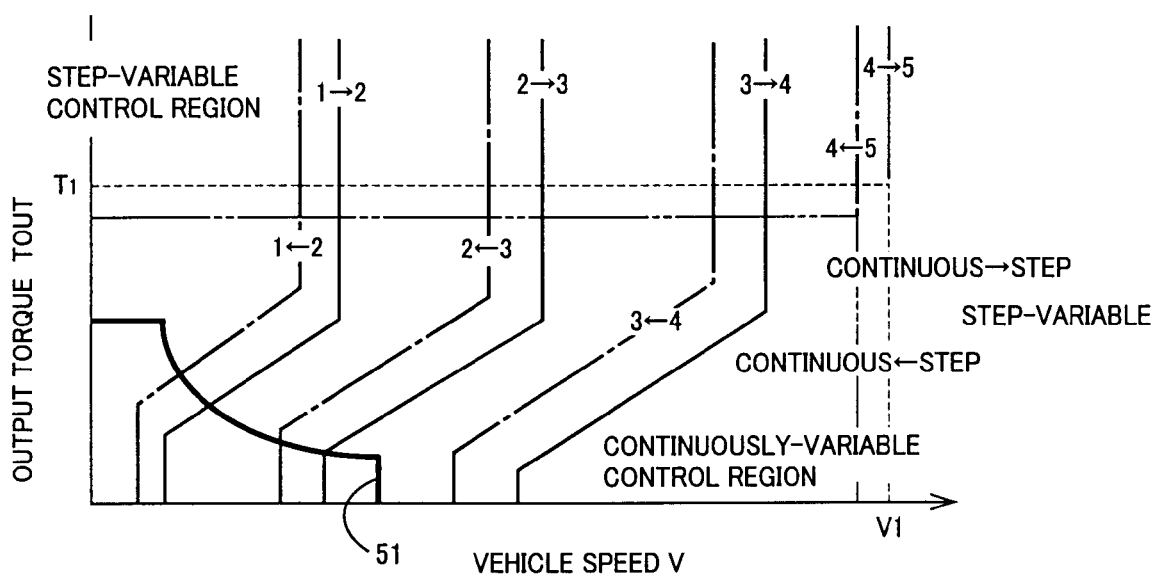
FIG. 9 is a view representing a relation memorized in advance to be used by the switching control means shown in FIG. 7, representing a relation different from the relation shown in FIG. 8.

On the other hand, in using the relation shown in FIG. 9, the above determination is performed based on the actual vehicle speed V and the output torque $T_{OUT}$ which is the drive-force-related value. In FIG. 9, a broken line represents a determination vehicle speed V1 and a determination output torque T1 for defining the predetermined condition to switch the continuously-variable shifting to the step-variable shifting. A two-chain dot line represents the condition for changing the step-variable shifting to the continuously-variable shifting. As apparent, hysteresis is provided between the step-variable shifting region and the continuously-variable shifting region. In FIG. 9, a region located at a lower output torque side and a lower vehicle speed side than the boundary line represented by a thick line is a motor running region for the vehicle to run by the drive force of the electric motor. In FIG. 9, shifting lines with the vehicle speed V and the output torque Tout as the parameter are shown as well.

The switching control means 50, determining the step-variable shifting region, outputs command to the hybrid control means 52 to inhibit the hybrid control or continuously-variable shifting control thereby, and commands to the step-variable shifting control means 54 to perform the predetermined shifting operation. The step-variable shifting control means 54, upon determination with FIG. 8, performs the automatic shifting control in accordance with the shifting diagram (not shown) memorized in advance. It performs the automatic shifting control, upon determination with FIG. 9, in accordance with the shifting diagram shown therein.

FIG. 2 shows the operation combinations of the hydraulically operated frictional coupling devices, that is the clutches C0, C1, C2, and the brakes B0, B1, B2 and B3, selected in the shifting control. In one of the first-speed position through the fourth-speed position of this step-variable automatic shifting control mode, the power distribution mechanism 16 functions as an auxiliary transmission having a fixed speed ratio γ0 of 1, with engagement of the switching clutch C0. In fifth-speed position, by engagement of the switching brake B0 instead of the switching clutch C0, the power distribution mechanism 16 functions as an auxiliary transmission having a fixed speed ratio γ0 of about 0.7. Thus, in the step-variable automatic shifting control mode, the drive apparatus 10 which includes the power distribution mechanism 16 functioning as the auxiliary transmission, and the automatic transmission 20, functions as a so-called automatic transmission as a whole.

The above drive-force-related value is a parameter corresponding to the drive force of the vehicle, which may be the drive torque or the drive force at the drive wheel. In addition, it may be an output torque $T_{OUT}$ of the automatic transmission 20, an engine output torque $T_E$, an acceleration value of the vehicle; an actual value such as the engine output torque $T_E$ calculated based on the operating angle of the accelerator pedal or the opening angle of the throttle valve (or intake air quantity, air/fuel ratio or amount of fuel injection) and the engine speed $N_E$; or an estimated value such as the engine output torque $T_E$ or required vehicle drive force calculated based on the amount of operation of the accelerator pedal by the vehicle operator or the operating angle of the throttle valve. The vehicle drive torque may be calculated based on not only the output torque $T_{OUT}$, etc., but also the ratio of a differential gear device of and the radius of the drive wheels 38, or may be directly detected by a torque sensor or the like. This is true for each of torques mentioned above.

On the other hand, when determining the continuously-variable control region, the switching control means 50 outputs command to the hydraulic control circuit 42 to release the switching clutch C0 and the switching brake B0 for placing the power distribution mechanism 16 in the continuously-variable shifting state. In addition, the switching control means 50 outputs, simultaneously with the above command to the hydraulic control circuit 42 for releasing the switching clutch C0 and the switching brake B0, signal to the hybrid control means 52 for permitting the hybrid control, and to the step-variable shifting control means 54 one of following two signals. One is the signal to hold the automatic transmission 20 in the gear position upon the continuously-variable shifting set advance, and other is to permit an automatic shifting according to the shifting diagram memorized in advance. In the latter case, the variable-step shifting control means 54 effects the automatic shifting by suitably selecting the combinations of the clutches and brakes shown in the operation Table of FIG. 2, except the combination of engagement of both the switching clutch C0 and brake B0.

Thus, by functions of the power distribution mechanism 16 as the continuously-variable transmission, and the automatic transmission connected in series thereto as the step-variable transmission, the drive force of suitable magnitude can be obtained. In addition, as described above, the rotating speed to be input to the automatic transmission 20 placed in one of the first-gear, second-gear, third-gear and fourth-gear positions, that is the rotating speed of the transmitting member 18 is continuously changed so that the continuous shifting ratio width can be obtained for each of the gear positions. Accordingly, since the speed ratio of the automatic transmission 20 is continuously variable across the adjacent gear positions, the overall speed ratio γT of the drive apparatus 10 is continuously variable.

The hybrid control means 52 controls the engine 8 to be operated in the high efficiency region, and controls the first electric motor M1 and the second electric motor M2 to establish an optimum proportion of the drive forces of the engine 8, the first electric motor M1 and/or the second electric motor M2. For instance, the hybrid control means 52 calculates the output as required by the driver at the current running speed of the vehicle based on the operating amount of the accelerator pedal and the vehicle running speed, and calculates a required drive force based on the required output calculated and a required charge amount by the first electric motor M1. Based on the required drive force calculated, the hybrid control means 52 calculates desired rotating speed $N_E$ and total output of the engine 8, and controls the actual output of the engine 8 and the generated electricity amount by the first electric motor M1, according to the calculated desired rotating speed and total output of the engine. The hybrid control means 52 effects the above hybrid control with taking account of the gear position of the automatic transmission 20 currently selected, or commands the shifting of the automatic transmission 20 to improve the fuel economy of the engine.

In such the hybrid control, the power distribution mechanism 16 is controlled to function as the electrically controlled continuously-variable transmission, for the optimum coordination of the rotating speed $N_E$ for efficient operation of the engine 8, and the rotating speed of the transmitting member 18 determined by both the vehicle speed and the selected gear position of the automatic transmission 20. That is, the hybrid control means 52 determines a target value of the overall speed ratio γT of the drive apparatus 10 so that the engine 8 is operated according to a highest-fuel-economy curve memorized in advance that satisfies both the drivability and the highest fuel economy of the engine 8 upon running in the continuously-variable shifting. The hybrid control means 52 controls the shifting ratio γ0 of the power distribution mechanism 16 to obtain the target value of the overall speed ratio γT, so that the overall speed ratio γT can be controlled within a predetermined range, for example, between 13 and 0.5.

In the hybrid control, the hybrid control means 52 controls an inverter 58 such that the electric energy generated by the first electric motor M1 is supplied to an electric-energy storage device 60 and the second electric motor M2 through it. Therefore, a main part of the drive force produced at the engine 8 is mechanically transmitted to the transmitting member 18, while the rest of the drive force is consumed by the first electric motor M1 to be converted into the electric energy, being supplied through the inverter 58 to the second electric motor M2, or subsequently consumed by the first electric motor M1. The drive force produced by operation of the second electric motor M2 or first electric motor M1 with the electric energy is transmitted to the transmitting member 18.

Components associated with from generation to consumption of the electric energy by the second electric motor M2 constructs the electric path for converting the power generated at the engine 8 to the electric energy and then convert the electric energy to the mechanical energy. Further, the hybrid control means 52 performs the motor running in which the vehicle is started and driven by the electric CVT function of the power distribution mechanism 16, irrespective of the stopped state or the idling state of the engine 8.

In the normal output region of the engine where the vehicle runs in the lower/medium speed and in the lower/medium output, the power distribution mechanism 16 is placed in the continuously-variable shifting state by the switching control means 50, the hybrid control means 52 and the step-variable shifting control means 54 to secure the fuel economy quality of the vehicle. In the high speed running or in the high rotation speed region of the engine 8, the power distribution mechanism 16 is placed in the fixed shifting state by the same to transmit the output of the engine 8 mainly through the mechanical power transmitting path to the drive wheel 38. Thus, the loss occurred upon conversion between power and electricity is suppressed to improve the fuel economy.

The power distribution mechanism 16 is placed in the fixed shifting state in the high output region of the engine, and it operates in the continuously-variable shifting state for the low/medium speed running and the low/medium output running of the vehicle. Accordingly, the maximum value of the electric energy to be generated by the first electric motor M1, that is, the electric energy to be transmitted by the same can be made small. In other words, the electric reaction force to be secured by the first electric motor M1 can be made small, so that the first electric motor M1 itself, the second electric motor M2, and the drive apparatus 10 including them can be further compactified.

Figure 10:
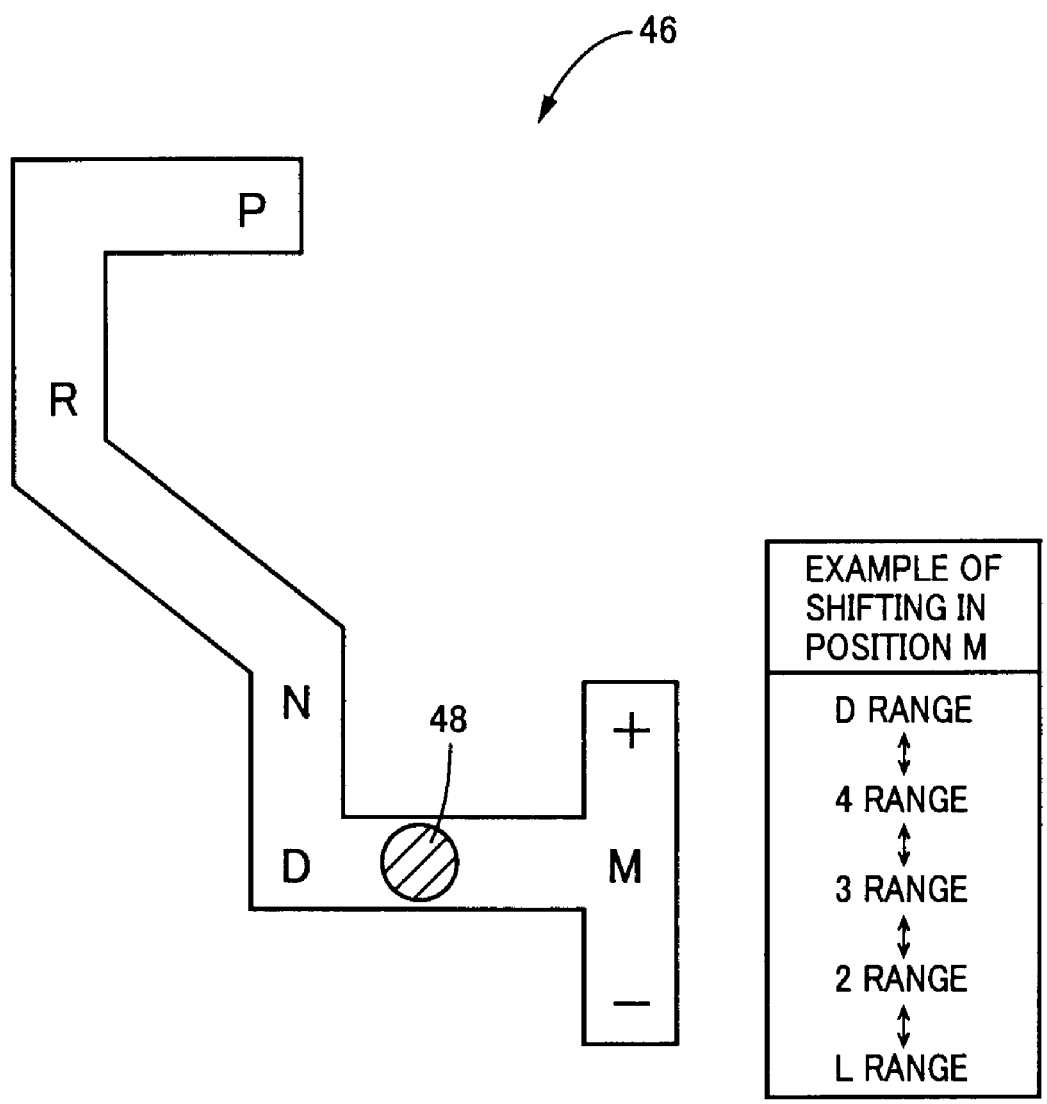
FIG. 10 is a view showing an example of a shift operation device 46 as a manually operable shifting device.

FIG. 10 shows an example of a shifting device 46 which is a manually operable shifting device. It is disposed laterally adjacent to an driver seat, for example, and has a shift lever 48 to be manually operated to select one of a plurality of gear positions including a parking position P, a reverse-drive position R, a neutral position N, an automatic forward-drive shifting position D, and a manual forward-drive shifting position M. Upon the parking position P, the drive apparatus 10 i.e., the automatic transmission 20 is placed in a neutral state where the power transmitting path is disconnected with release of the switching clutch C0 and brake B0, and simultaneously the drive apparatus output shaft 22 of the automatic transmission 20 is placed in the locked state. Upon the reverse-drive position R, the vehicle is driven in the rearward direction, and upon the neutral position N, the drive apparatus 10 is placed in the neutral state.

The parking position P and the neutral position N are non-running positions selected upon non-running of the vehicle, while the reverse-drive position R and the automatic and manual forward-drive shifting positions D and M are driving positions selected upon running of the vehicle. The automatic forward-drive shifting position D provides a highest-speed position, and positions "4" through "L" selectable therein are engine-braking positions for obtaining an engine brake.

The manual forward-drive shifting position M is located at the same position as the automatic forward-drive shifting position D in the vehicle longitudinal direction, and is spaced from or adjacent to the automatic forward-drive shifting position D in the vehicle lateral direction. The shift lever 48 is operated to the manual forward-drive shifting position M, for manually selecting one of the positions "D" through "L". Described in detail, the shift lever 48 is movable from the manual forward-drive shifting position M to a shift-up position "+" and a shift-down position "−" spaced from each other in the longitudinal direction. Each movement of shift lever 48 to the shift-up position "+" or the shift-down position "−", the currently selected position is changed to any of the positions "D" through "L" position.

The five positions "D" through "L" in the "M" position are plural kinds of shifting positions of which the total shifting ratios γT at the high-speed side (minimum side of the shifting ratio) are different in variable range of the total shifting ratio γT attainable by the automatic transmission 20 upon the automatic shifting control. They limit the shiftable range of the shifting position (gear position) so that the shifting positions at the maximum speed side attainable by shifting of the automatic transmission 20 are different. The shift lever 48 is biased by biasing means such as a spring to be automatically returned from the shift-up position "+" and shift-down position "−" back to the manual forward-drive shifting position M. The shifting device 46 is provided with shift-position sensors (not shown) to detect each shifted position of the shift lever 48, position of the shift lever 48 and the number of the shift operation of the shift lever 48 at the manual forward-shifting position "M" are output to the electronic control device 40.

For example, when the shift lever 48 is operated to the automatic forward-drive shifting position "D", the switching control means 50 effects an automatic switching control of the drive apparatus 10, the hybrid control means 52 effects the continuously-variable shifting control of the power distribution mechanism 16, and the step-variable shifting control means 54 effects an automatic shifting control of the automatic transmission 20. When placed in the step-variable shifting state for the step-variable shifting running, for example, shifting of the drive apparatus 10 is automatically controlled to select an appropriate one of the first-gear position through the fifth-gear position indicated in FIG. 2.

When placed in the continuously-variable shifting state for the continuously-variable shifting running, the overall speed ratio γT of the drive apparatus 10 is controlled to be continuously variable within the predetermined range, which is obtained by the shifting ratio width of the power distribution mechanism 16 continuously variable and one of the first-gear through fourth-gear positions of the automatic transmission 20 automatically controlled. The automatic forward-drive position "D" is a position selected to establish an automatic shifting mode (automatic mode) in which the drive apparatus 10 is automatically shifted.

When the shift lever 48 is operated to the manual forward-drive shifting position "M", shifting of the drive apparatus 10 is automatically controlled by the switching control means 50, hybrid control means 52 and step-variable shifting control means 54, such that the overall speed ratio γT varies within a predetermined range which can be attainable by each shifting position of the drive apparatus 10, not to exceed the shifting position or shifting ratio at the maximum side of the shifting range. When the drive apparatus 10 is placed in the step-variable shifting state, for example, shifting of the drive apparatus 10 is automatically controlled within the predetermined range of the overall speed ratio γT.

In the continuously-variable shifting state for the continuously-variable shifting running, the overall speed ratio γT of the drive apparatus 10 is controlled to be continuously variable within the predetermined range in each shifting position, which is obtained by the shifting ratio width of the power distribution mechanism 16 continuously variable, and one of the first-gear through fourth-gear positions of the automatic transmission 20 automatically controlled. The manual forward-drive position "M" is a position selected to establish a manually shifting mode (manual mode) in which the selectable gear positions of the drive apparatus 10 are manually selected.

Figure 11:
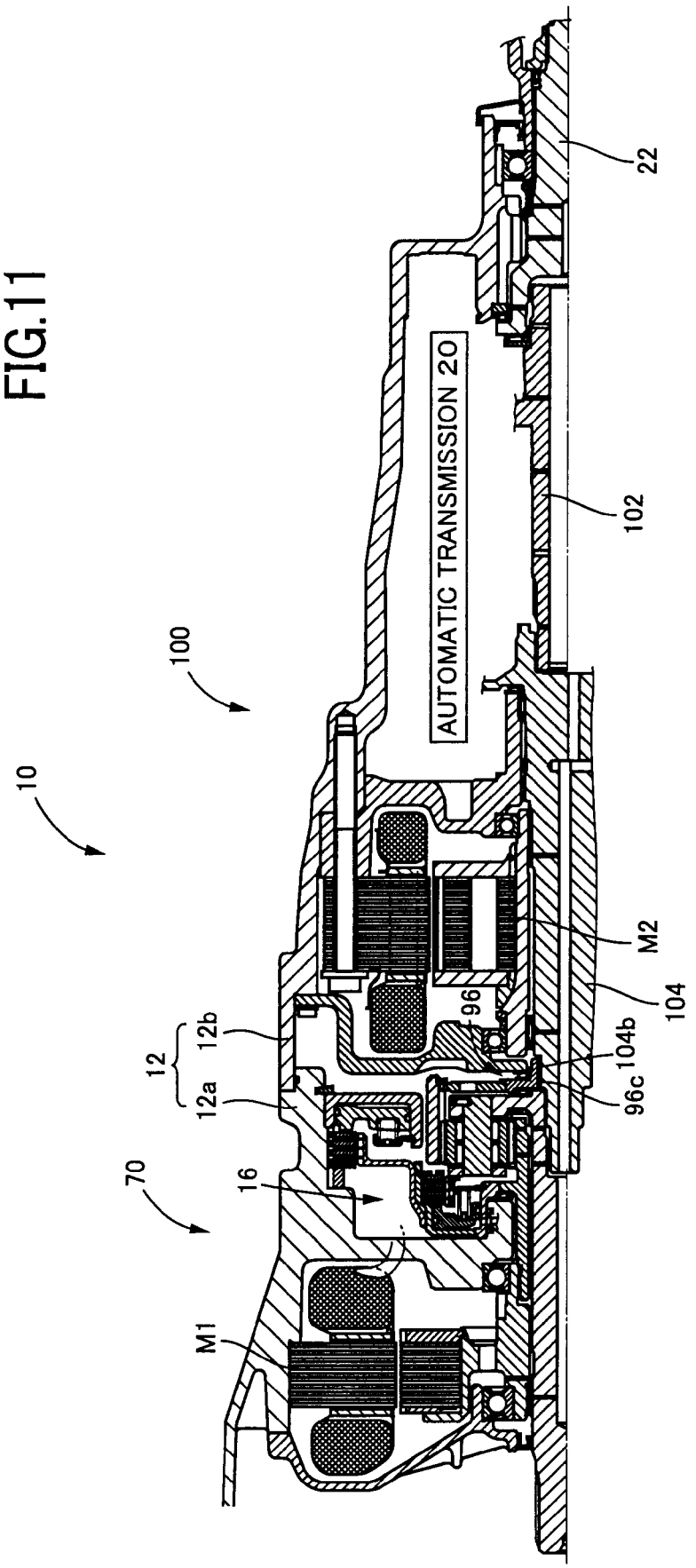
FIG. 11 is a sectional-view of the drive apparatus shown in FIG. 1.
Figure 12:
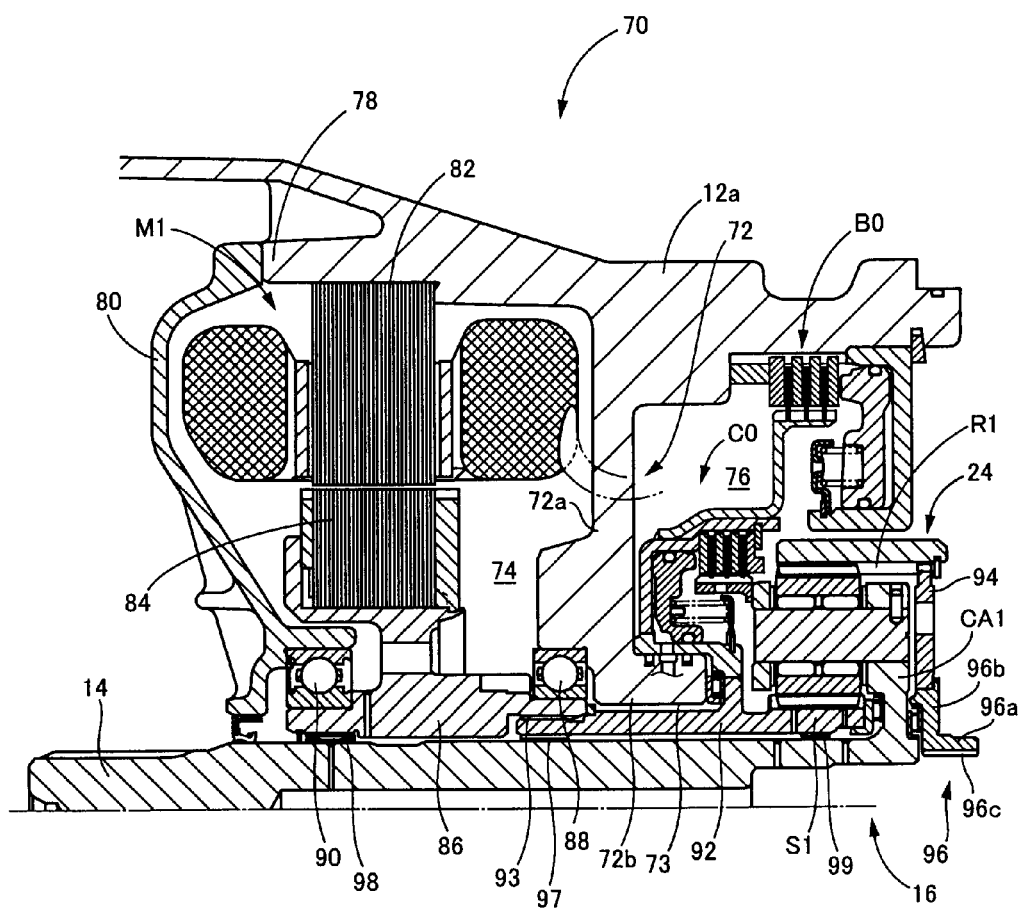
FIG. 12 is a cross-sectional view of a first unit of the drive apparatus shown in FIG. 1.
Figure 13:
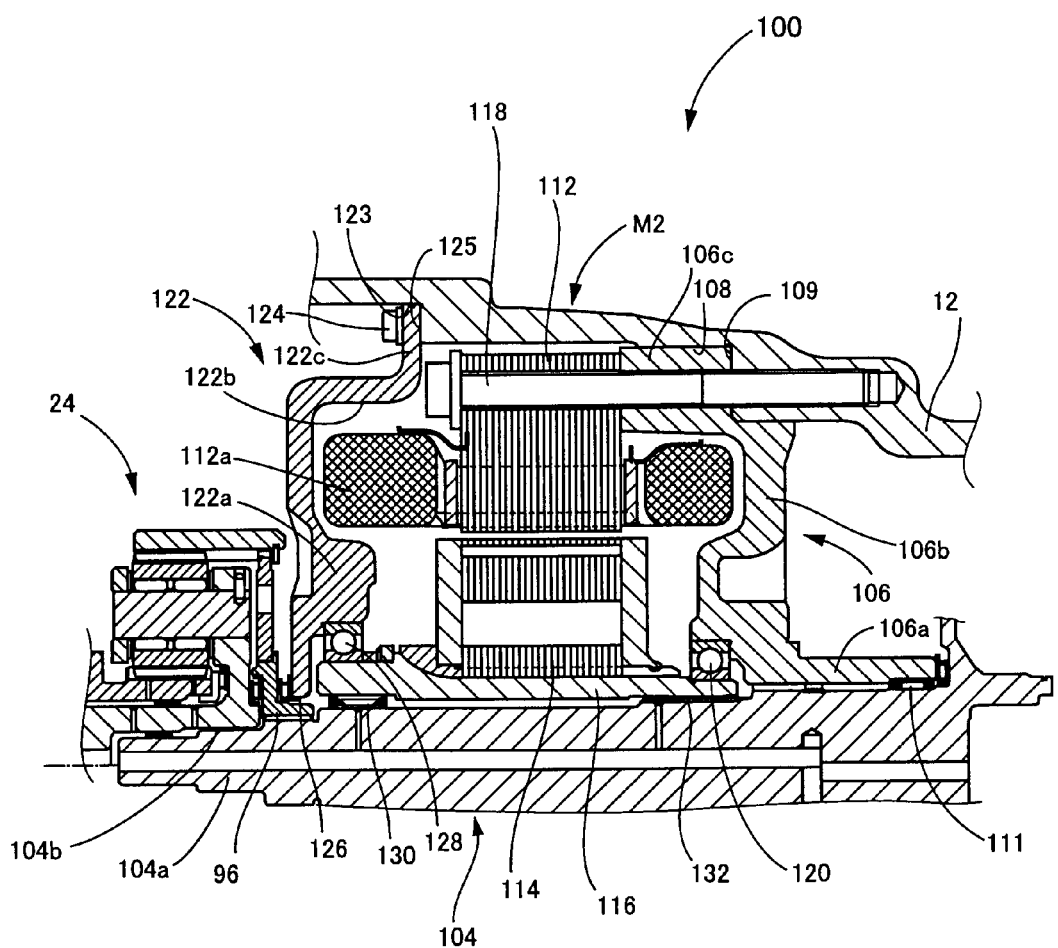
FIG. 13 is a partial enlarged sectional-view of a second unit of the drive apparatus shown in FIG. 1.

FIG. 11 is a sectional-view of the above drive apparatus 10, and FIGS. 12 and 13 are enlarged cross-sectional view of a first unit (first power transmitting portion) 70 and a second unit (second power transmitting portion) 100, of the drive apparatus 10.

As shown in FIG. 11, the case 12 comprises a first case 12a (corresponding to a second case in the illustrated embodiment) acting as a case of a first unit 70 and a second case 12a acting as a case of a second unit 72. The first case 12a accommodates therein the first electric motor M1 and the power distributing mechanism (that is, a first gear unit) 16 or the like and the second case 12b accommodates therein the second electric motor M2 and the automatic power transmission (that is, a second gear unit) 20 or the like.

As shown in FIG. 12, the first case 12a has a substantially tubular outer diametric shape with a part, accommodating therein the power distributing mechanism 16, which has a substantially fixed outer diameter. Meanwhile, a part accommodating therein the first electric motor M1 has an outer diameter that increases towards the engine 8 (leftward in the drawing). Further, the first case 12a has both ends opened in an axial direction, and a partition wall 72 integrally formed therewith in a part between the power distributing mechanism 16 and the first electric motor M1. The partition wall 72 has a vertical portion 72a extending substantially perpendicular to the drive apparatus input shaft 14 and a tubular portion 72b having one axial end connected to an inner peripheral end of the vertical portion 72a and extending towards the first planetary gear unit 24.

The tubular portion 72b has a central area formed with a through-bore 73 extending in an axial direction. Being partitioned with the partition wall 72, the casing 12 is divided into a first accommodating compartment 74 facing the engine 8 to accommodate the first electric motor M1, and a second accommodating compartment 76 for accommodating the power distributing mechanism 16. Accordingly, in the illustrated embodiment, the partition wall 72 functions as a wall member. In addition, the first electric motor M1 is accommodated in the first accommodating compartment 74 from a left side in the drawing and the power distributing mechanism 16 is accommodated in the second accommodating compartment 76 from a right side in the drawing.

Further, the first case 12a is formed with an annular protrusion 78 axially protruding towards the engine 8 in parallel to the drive apparatus input shaft 14 such that the first accommodating compartment 74 has substantially fixed diameter. A cover plate 80 is fixed to an outer circumferential edge of the protrusion 78 in abutting engagement therewith.

The first electric motor M1 includes a first stator (stationary part) 82, a first rotor (rotator) 84 and a first rotor support shaft (rotary shaft) 86 integrally formed with the first rotor 84. The first rotor support shaft 86 has one end supported with the partition wall 72 on an inner circumferential periphery thereof via a bearing 88, and the other end supported with the cover plate 80 by means of a bearing 90. A sun gear shaft 92, functioning as a power transmitting shaft for connecting the first electric motor M1 and the first planetary gear unit 24 for power transmitting capability, is integrally formed with a first sun gear S1. It passes through the through-bore 73 of the partition wall 72 into an inner circumferential periphery of the first rotor support shaft 86. The sun gear shaft 92 has one end, facing the first rotor support shaft 86, which is coupled through a spline 93 to one end of the first rotor support shaft 86 in an area facing the partition wall 72, for unitary rotations of the sun gear shaft 92 and the first rotor support shaft 86.

On an inner periphery of the sun gear shaft 92 at a position radially inward the bearing 88, an inner periphery of the first rotor support shaft 86 at a position radially inward the bearing 90, and an inner periphery of the sun gear S1, a bush 97, a bearing 98 and a bush 99 are provided, respectively. The drive apparatus input shaft 14 is supported with the first rotor support shaft 86 and the sun gear shaft 92, via the bush 97, the bearing 98 and the bush 99 on inner peripheries of the first rotor support shaft 86 and the sun gear shaft 92 in a center of axis of the first case 12a to be rotatable relative to each other.

Further, the drive apparatus input shaft 14 has one end integrally connected to the first carrier CA1. Thus, the drive apparatus input shaft 14 is integrally connected to the first carrier CA1 to form an input shaft of the first planetary gear unit 24.

The first ring gear R1 of the first planetary gear unit 24 has one end, facing a second unit 100, which has an inner periphery to which an annular plate 94 is fixed to be immovable in an axial direction and circumferential direction. The annular plate 94 extends perpendicular to an axis center of the drive apparatus input shaft 14 and has a central area formed with a bore. The first planetary gear unit 24 has an output shaft (that is, an output shaft of the power distributing mechanism 16) 96 including a tubular shaft portion 96a protruding towards the second unit 100, and a flange portion 96b radially protruding from the shaft portion 96a on a side closer to the first planetary gear unit 24. The flange portion 96b is joined to the annular plate 94 for unitary rotation therewith. Moreover, the shaft portion 96a has an inner circumferential periphery formed with spline teeth 96c. The switching clutch C0 is placed between the partition wall 72 and the first planetary gear unit 24, and a switching brake B0 is placed in a radially outward area of the first planetary gear unit 24.

Next, the second unit 100 will be described. As shown in FIG. 11, the second case 12b is opened on a side facing the first unit 70 and has a tapered shape that decreases in diameter (in outer and inner diameters) towards the drive apparatus output shaft 22 in a stepwise fashion. The automatic transmission 20 and the second electric motor M2 are accommodated in the second case 12b in sequence from a rear area (at a position closer to the drive apparatus output shaft 22), formed in a small diameter, to the open side of the second case 12b.

Moreover, the drive apparatus output shaft 22, an intermediate shaft 102 of the automatic transmission 20, and an input shaft 104 of the automatic transmission 20 are coaxially placed in the second case 12b on an axis center of the second case 12b in sequence from a rear area thereof to be rotatable relative to each other. The input shaft 104 has one end, closer to a rear area of the second case 12b, which is placed in the vicinity of one end of the second electric motor M2 and extends toward the open end of the second case 12b. Though not shown in FIG. 11, moreover, the drive apparatus output shaft 22 is connected to the fourth carrier CA4 of the fourth planetary gear unit 30 for unitary rotation therewith, and the intermediate shaft 102 is connected to the fourth sun gear S4 of the fourth planetary gear unit 30 for unitary rotation therewith (see FIG. 1).

As shown in FIG. 13 representing a fragmentary enlarged view of the second unit 100, the second case 12b has a first support wall 106 placed between the automatic transmission 20 and the second electric motor M2. The first support wall 106 is held in fitting engagement with the input shaft 104 on one end thereof in an area facing the drive apparatus output shaft 22 (on a right side in the drawing). The first support wall 106 includes a tubular portion 106a axially extending in coaxial relation with the input shaft 104, a connecting portion 106b having an inner peripheral end connected to the tubular portion 106a on one end thereof in face of the second electric motor M2 and extending radially outward, and an outer circumferential annular portion 106c having one axial end connected to an outer circumferential periphery of the connecting portion 106b and axially extending towards the second electric motor M2.

The first support wall 106 has an inside-down structure with the second case 12b. That is, the outer circumferential annular portion 106c of the first support wall 106 has an outer circumferential periphery held in abutting engagement with a first abutting surface 108 formed in the second case 12b on an inner circumferential periphery thereof in parallel to the axis thereof. Under a situation where the outer circumferential annular portion 106c is not fixed by bolts 118, the outer circumferential periphery of the outer circumferential annular portion 106c is made slidable on the first abutting surface 108. Accordingly, the first support wall 106 can be fitted to the second case 12b with no need to be press fitted.

Further, the outer circumferential annular portion 106c has one side surface, formed in opposition to the second electric motor M2, which is held in abutting contact with a first radial surface 109 formed on the second case 102b to radially extend inward from one end, opposing to the second electric motor M2, of the first abutting surface 108. Accordingly, by merely fitting the first support wall 106 to the second case 12b so as to allow the outer circumferential periphery and the side surface of the outer circumferential annular portion 106c to be brought into abutting contact with the first abutting surface 108 and the first radial surface 109 of the second case 12b, respectively, the outer circumferential annular portion 106c can be positioned in its axial direction and radial direction with high precisions. The input shaft 104 has one end, facing the automatic transmission 20, which is supported on the tubular portion 106a of the first support wall 106 by means of a bearing 111 provided on an inner periphery of the tubular portion 106a of the first support wall 106 to be rotatable relative thereto.

The second electric motor M2 includes a second stator (stationary part) 112, a second rotor (rotator) 114 and a second rotor shaft (rotary shaft) 116 integrally formed with the first rotor 114. The second stator 112 and the first support wall 106 are fixed to the second case 102b by means of bolts 118 axially extending through the second stator 112 and the outer circumferential annular portion 106c of the first support wall 106, and screwed into the second case 12b. Moreover, the second rotor support shaft 116 has one end, facing the automatic transmission 20, that is, one end facing the drive apparatus output shaft 22, which is supported with the first support wall 106 by means of a bearing 120 whose outer circumferential periphery is held in abutting contact with an inner circumferential periphery of the tubular portion 106a of the first support wall 106.

A second support wall 122 is disposed on the open side of the second case 12b in an area apart from the second electric motor M2, that is, in opposition to the first support wall 106. The second support wall 122 also has an inside-down structure with the second case 12b. That is, the second support wall 122 has an outer circumferential surface held in abutting contact with a second abutting surface 123 formed on an inner circumferential surface of the second case 12b in an area closer to the open end of the second case 12b than the second abutting surface 108 and extending radially outward therefrom. In the unfixed state, the outer circumferential surface of the second support wall 122 is made slidable along the second abutting surface 123.

Further, the second support wall 122 has a side wall, facing the second electric motor M2, whose outer circumferential end is held in abutting contact with a second radial surface 125 formed on the second case 12b so as to extend radially inward from one end of the second abutting surface 123 in an area facing the second electric motor M2. Accordingly, by merely fitting the second support wall 122 to the second case 12b such that its outer circumferential periphery and side surface are brought into abutting contact with the second abutting surface 123 and the second radial surface 125 of the second case 12b, respectively, the second support wall 122 can be also positioned in its axial direction and radial direction with high precisions.

The second support wall 122 is fixed to the second case 12b via the bolts 124 and has a radial center formed with a bore 126 extending in an axial direction. The input shaft 104 extends towards the first unit 70 and has a protruding portion 104a extending through the second rotor support shaft 116 and the bore 126 to protrude towards the first unit 70. The protruding portion 104a (that is, a leading end of the input shaft 104) has an outer periphery formed with spline teeth 104b in an area radially facing the bore 126.

Further, the second support wall 122 includes a convexed portion 122a axially protruding towards the second rotor 114 in an area radially inward the second stator 112, a concaved portion 122b radially extending outward from the convexed portion 122a and axially concaved towards the first unit 70, that is, in opposition to the second electric motor M2, and an outer circumferential marginal portion 122c connected to an outer circumferential edge of an opening of the concaved portion 122b allowing the bolts 124 to extend. The convexed portion 122a has an inner circumferential periphery with which a bearing 128 is held in abutting contact. Furthermore, the second stator 112 has a stator coil 112a that is accommodated in the concaved portion 122b.

The second rotor support shaft 116 has the other end, opposite to one end thereof supported with the first support wall 106, which is supported with the second support wall 122 by means of the bearing 128. Moreover, the other end, closer to the second support wall 122, of the second rotor support shaft 116 supports the input shaft 104 via a bearing 130 placed radially inward the bearing 128 and is coupled to the input shaft 104 via a spline 132 formed on one end thereof in an area closer to the first support wall 106 such that the second rotor support shaft 116 is unitarily rotation with the input shaft 104.

With the second unit 100 formed in such a structure, the relevant component parts are assembled in sequence starting from the component part accommodated in the second case 12b at the rearmost area thereof. That is, the automatic transmission 20 is initially accommodated in the second case 12b, to which the first support wall 106 and the second electric motor M2 are accommodated in this order. Lastly, the second support wall 12b is mounted on the second case 12b, enabling the second unit 100 to be assembled. Upon completely assembling the first and second units 70, 100, respectively, the spline teeth 96c of the output shaft 96 acting as a member of the second unit 70, and the spline teeth 104b of the input shaft 104 acting as a member of the second unit 100, are coupled (in spline connection), thereby enabling the drive apparatus 10 to be assembled in a manner as shown in FIG. 11. In addition, the transmitting member 18, shown in FIG. 1, includes the output shaft 96 and the input shaft 104 that are spline coupled to each other for unitary rotation.

In the illustrated embodiment, as set forth above, the automatic transmission 20 and the second electric motor M2 are accommodated in one case (second case 12b), and the input shaft 104 of the automatic power transmission 20 and the second rotor support shaft 116 of the second electric motor M2 are supported with the first support wall 106 and second support wall 122, respectively, which are mounted on the second case 12b. Thus, the automatic transmission 20 and the second electric motor M2 can be unitized as a power transmitting portion, resulting in an increase in assembling workability of the drive apparatus 10.

In the illustrated embodiment, further, the first electric motor M1 and the power distributing mechanism 16 form another unit (as a power transmitting portion), that is, the first unit 70 such that the drive apparatus 10 is structured with the two units 70, 100. Thus, upon assembling the two units 70, 100, respectively, merely coupling these component parts to each other enables the drive apparatus 10 to be assembled. This results in a further increase in assembling workability of the drive apparatus 10.

In the illustrated embodiment, furthermore, the first unit 70 can be assembled such that the power distributing mechanism 16 is accommodated in the first case 12a on one side thereof and the first electric motor M1 is accommodated in the first case 12a on the other side thereof, providing improved assembling workability.

In the illustrated embodiment, moreover, the first support wall 106 held in abutting contact on the outer circumferential surface thereof with the inner circumferential surface (first abutting surface 108) of the second case 12b, can be positioned in a radial direction with high precision. Moreover, the second support wall 122 also held in abutting contact with the inner circumferential surface (second abutting surface 123) of the second case 12b, can also be positioned in a radial direction with high precision. In addition, the second rotor support shaft 116 of the second electric motor M2 having both ends supported with the first and second support walls 106, 122, respectively, can also be positioned in a radial direction with high precision.

Further, the input shaft 104 of the automatic power transmission 20 supported with the second rotor support shaft 116 and the first support wall 106, can also be positioned in a radial direction with high precision. Consequently, this particularly provides an ease of performing the assembling work of the drive apparatus 10 for the input shaft 104 and the output shaft 96 of the power distributing mechanism 16 to be coupled to each other, while making it easy to perform the operations of the input shaft 104 and the output shaft 96 for unitary rotation.

In the illustrated embodiment, furthermore, since the stator coil 112a of the second electric motor M2 is accommodated in the concaved portion 122b formed on the second support wall 122 in the axially concaved configuration, a space can be effectively utilized, enabling the drive apparatus 10 to be shortened in an axial length thereof.

Meanwhile, the second stator 112 is held in abutting contact with a side surface of the inner circumferential tubular portion 106c of the first support wall 106, that is, the inner circumferential tubular portion 106c of the first support wall 106 intervenes between the second stator 112 and the case 12, so that an axial position of the second stator 112 is fixed. Accordingly, the inner circumferential tubular portion 106c of the first support wall 106 functions as a space between the second stator 112 and the case 12 and thus, the first support wall 106 can also be regarded as a structure having the space unitarily formed.

In addition, the second stator 112 and the first support wall 106 are fastened to the case 12 by means of bolts 118 axially extending through the inner circumferential tubular portion 106c of the first support wall 106 and clenched to the case 12.

The input shaft 104, extending towards the first unit 70 (leftward in the drawing), passes through the second rotor support shaft 116 and the through-bore 126 to protrude into the first unit 70. The input shaft 104 has the area, placed in opposition to the through-bore 126, to which the output shaft 96 of the first planetary gear unit 24 is spline coupled. Moreover, the transmitting member 18, shown in FIG. 1, includes the input shaft 104 and the output shaft 96 that are spline coupled to each other for unitary rotation.

In the illustrated embodiment, as set forth above, the spacer is unitarily formed with the first support wall 106. Therefore, merely fixing the first support wall 106 to the case 12 enables the spacer of the second stator 112 to be fixed to the case 12 at the same time. Thus, no need arises for providing a discrete structure for separately fixing the spacer to the case 12, making it possible to prevent the drive apparatus 10 from increasing in size.

In the illustrated embodiment, stated another way, the first support wall 106 intervening between the case 12 and the second stator 112 of the second electric motor M2 functions as a spacer between the second stator 112 of the second electric motor M2 and the case 12. Thus, no need arises for separately providing a spacer, enabling the drive apparatus 10 to be prevented from increasing in size.

While the present invention has been described above with reference to the illustrated embodiment shown in the accompanying drawings, the present invention may be implemented in other modes.

For instance, in the illustrated embodiment, the drive apparatus 10 is structured to enable the power distribution mechanism 16 to be switched in the differential state and the non-differential state for the continuously variable shifting state functioning as the electrically continuously variable transmission and the step-variable shifting state functioning as the step-variable shifting transmission. However, the switching between the continuously variable shifting state and the step-variable shifting state is performed as one mode of placing the power distribution mechanism 16 in the differential state and the non-differential state. Even if, for instance, placed in the differential state, the power distribution mechanism 16 may be arranged to function as a step-variable transmission with the shifting speed ratio thereof made variable not in a continuous mode but in a stepwise mode. In other words, since the differential state/non-differential state and the continuously variable shifting state/step-variable shifting state of the drive apparatus 10 (the power distributing mechanism 16) do not necessarily fall in a one-on-one correspondence, the drive apparatus 10 needs not necessarily formed in a structure to enable the switching between the step-variable shifting state and the continuously variable shifting state.

In the power distribution mechanisms 16 in the illustrated embodiments, the first carrier CA1 is fixed to the engine 8, and the first sun gear S1 is fixed to the first electric motor M1, and the first ring gear R1 is fixed to the transmitting member 18. However, such connecting arrangement is not essential, and the engine 8, first electric motor M1 and the transmitting member 18 are fixed to respective ones of the three elements CA1, S1 and R1 of the first planetary gear set 24.

Although the engine 8 is directly connected to the drive apparatus input shaft 14 in the illustrated embodiments, it may be operatively connected to the drive apparatus input shaft 14 through gears, a belt or the like, and need not be disposed coaxially therewith.

In the embodiments, the first electric motor M1 and the second electric motor M2 are disposed coaxially with the drive apparatus input shaft 14, the first electric motor M1 is fixed to the first sun gear S1, and the second electric motor M2 is fixed to the transmitting member 18. However, such arrangement is not essential. For example, the first electric motor M1 may be fixed to the first sun gear S1 through gears, a belt or the like, and the second electric motor M2 may be fixed to the transmitting member 18.

Although the power distribution mechanism 16 is provided with both the switching clutch C0 and the switching brake B0, it need not be provided with both of them, and may be provided with only one or none of the switching clutch C0 and brake B0. Although the switching clutch C0 selectively connects the sun gear S1 and carrier CA1 to each other, it may selectively connect the sun gear S1 and ring gear R1 to each other, or the carrier CA1 and ring gear R1. In essence, the switching clutch C0 sufficiently connects any two of the three elements of the first planetary gear set 24.

The switching clutch C0 in the embodiment is engaged to establish the neutral position "N" in the drive apparatus 10, but the neutral position need not be established by engagement thereof.

The hydraulic-type frictional coupling devices such as the switching clutch C0 and switching brake B0 may be a coupling device of a magnetic-powder type, an electromagnetic type or a mechanical type, such as a powder (magnetic powder) clutch, an electromagnetic clutch and a meshing type dog clutch.

In the illustrated embodiment, further, although the drive apparatus 10 comprises the drive apparatus for hybrid vehicle in which the drive wheels 38 are driven with torques of the first electric motor M1 and second electric motor M2 in addition to the engine 8, the present invention may also be applied even to a drive apparatus for vehicle in which the power distributing mechanism 16 has only a function of a continuously variable transmission, referred to as an electric CVT, in which no hybrid control is performed.

Furthermore, the power distributing mechanism 16 in the illustrated embodiment may comprise a differential gear unit wherein, for instance, a pinion drivably rotated with an engine and a pair of bevel gears meshing with the pinion are operatively connected to the first electric motor M1 and second electric motor M2.

Moreover, while the power distributing mechanism 16 in the illustrated embodiment is composed of one set of planetary gear unit, it may comprise more than two planetary gear units that function as a power transmission with more than three stages in a fixed shifting state.

In the illustrated embodiment, further, although the second gear device comprises the automatic transmission 20 including three planetary gear units 26, 28, 30, the second gear device may comprise a gear reduction mechanism including one planetary gear unit like a structure disclosed in the above Patent Publication 1. Furthermore, even in a case where the automatic transmission is employed as the second gear device, a structure of the automatic transmission is not limited to that of the illustrated embodiment and it is construed not to be particularly limited by the specific disclosure such as the number of planetary gear units, the number of gear-shift positions and which of the component elements of the planetary gear units is selectively coupled to the clutch C and the brake B.

In the illustrated embodiment, furthermore, while the second support wall 122 is fixed to the second case 12b via the bolts 122, the second support wall 122 may be integrally formed with the second case 12b so as to fix the second support wall 122 to the second case 12b.

In the illustrated embodiment, moreover, the outer circumferential tubular portion 106c of the first support wall 106 may be axially split into a plurality of tubular segments. Even if the outer circumferential tubular portion 106c are axially split into the plurality of tubular segments, all of these plural segments may be fastened to the second case 12b together with the second stator 112 of the second motor M2 using the bolts 124. Thus, the number of bolts does not increase and no deterioration takes place in assembling workability due to an increase in the number of bolts.

In the illustrated embodiment, further, the first support wall 106 or the second support wall 122 may be of the type that function as an oil pump body in which a pump rotor is accommodated.

Also, the particular arrangement described absolutely represents one illustrative embodiment, and the present invention can be implemented in various modifications and improvements, according to knowledge of the skilled person in this field.

The invention claimed is:

1. A drive apparatus for vehicle including a first electric motor, a first gear device, a second electric motor and a second gear device comprising:
   one power transmitting portion including a single case, and the second electric motor and the second gear device accommodated in the single case;
   at least one end of the second gear device being supported with a first support wall detachably fixed on the single case;
   the second electric motor being accommodated in a compartment formed in the single case in opposition to the second gear device with respect to the first support wall for accommodating therein the second electric motor; and
   the second electric motor includes a rotary shaft being supported with a second support wall fixed to the single case on a side opposite to the first support wall with respect to the second electric motor,
   wherein the first electric motor and the first gear device form an other power transmitting portion,
   the other power transmitting portion includes a second case that accommodates the first electric motor and the first gear device therein,
   the rotary shaft of the second electric motor is further rotatably supported with the first support wall,
   an input shaft of the second gear device is rotatably supported by the first support wall, and
   the second gear device includes a plurality of planetary gear units.

2. The drive apparatus for vehicle according to claim 1, wherein the one transmitting portion and the other power transmitting portion are connected to each other.

3. The drive apparatus for vehicle according to claim 2, wherein the first electric motor, the first gear device and the second electric motor form an electrically controlled differential portion.

4. The drive apparatus for vehicle according to claim 3, wherein the electrically controlled differential portion and the second gear device form a plurality of gear ratio positions.

5. The drive apparatus for vehicle according to claim 1, wherein:
   the second case includes a wall member that partitions the second case into a first accommodating compartment that accommodates the first electric motor and a second accommodating compartment that accommodates the first gear device; and
   the first electric motor and the first gear device are coupled to each other for power transmitting capability with the wall member intervening therebetween.

6. The drive apparatus for vehicle according to claim 5, wherein the first gear device is rotatably supported with the wall member of the second case.

7. The drive apparatus for vehicle according to claim 1, wherein:
   the first support wall includes an outer circumferential surface held in abutting contact with a first inner circumferential surface of the single case.

8. The drive apparatus for vehicle according to claim 7, wherein the second support wall includes an outer circumferential surface held in abutting contact with a second inner circumferential surface of the single case.

9. The drive apparatus for vehicle according to claim 1, wherein the second support wall is formed with a concaved portion axially concaved for accommodating a stator coil of the second electric motor, and an outer circumferential margin of the second support wall being connected to an opening margin of the concaved portion.

10. The drive apparatus for vehicle according to claim 1, wherein the first support wall is fixed to the single case by bolts.

11. The drive apparatus for vehicle according to claim 1, wherein the second support wall is fixed to the single case by bolts.

12. The drive apparatus for vehicle according to claim 1, wherein the plurality of planetary gear units are switched to establish a rearward running position.

13. A drive apparatus for vehicle, comprising:
   an electric motor;
   a rotating device including a rotating shaft; and
   a stator of the electric motor that is mounted on a case via a spacer, wherein the rotating shaft of the rotating device is rotatably supported with a support wall that is detachably provided to the case,
   the spacer and the support wall are integrally formed with each other, and
   the stator is affixed to the case by a bolt that axially extends through the stator and through a through hole of the support wall, such that the support wall is affixed to the case via the bolt.

14. The drive apparatus for vehicle according to claim 13, wherein
   the rotating device is a gear device including a gear, and
   the rotating shaft is a gear shaft.

15. The drive apparatus for vehicle according to claim 14, wherein the gear device includes a plurality of planetary gear units.

16. The drive apparatus for vehicle according to claim 14, wherein the electric motor also includes a rotor rotatably supported by the support wall.

17. The drive apparatus for vehicle according to claim 14, wherein the gear shaft of the gear device includes a first end supported by the support wall and a second end supported by a rotor support shaft of the electric motor.

18. A drive apparatus for vehicle, comprising:
   an electric motor;
   a rotating device including a rotating shaft that is rotatably supported by a support wall which is detachably provided to a case, wherein
   the support wall is interposed between a stator of the electric motor and the case, and
   both the stator and the support wall are integrally fastened to the case by a bolt that axially extends through the stator and through a through hole of the support wall.

19. The drive apparatus for vehicle according to claim 18, wherein
   the rotating device is a gear device including a gear, and
   the rotating shaft is a gear shaft.

20. The drive apparatus for vehicle according to claim 19, wherein the gear device includes a plurality of planetary gear units.

21. The drive apparatus for vehicle according to claim 19, wherein the electric motor also includes a rotor rotatably supported by the support wall.

22. The drive apparatus for vehicle according to claim 19, wherein the gear shaft of the gear device includes a first end supported by the support wall and a second end supported by a rotor support shaft of the electric motor.

* * * * *